(12) United States Patent
McGinniss et al.

(10) Patent No.: US 6,610,219 B2
(45) Date of Patent: Aug. 26, 2003

(54) FUNCTIONAL MATERIALS FOR USE IN OPTICAL SYSTEMS

(75) Inventors: Vincent D. McGinniss, Sunbury, OH (US); Steven M. Risser, Reynoldsburg, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 09/777,439

(22) Filed: Feb. 6, 2001

(65) Prior Publication Data

US 2002/0185633 A1 Dec. 12, 2002

(51) Int. Cl.$^7$ .............................. F21V 9/14; F21V 9/00; C08F 20/10; C08G 63/68
(52) U.S. Cl. ...................... 252/582; 252/589; 526/242; 526/245; 526/272; 526/318; 359/494; 359/500; 570/111; 570/113; 570/123; 570/122; 570/128; 570/129; 570/131; 570/141; 570/182; 570/183; 570/184; 570/185; 570/187; 570/188; 570/189
(58) Field of Search ................................ 252/582, 589; 526/242, 245, 237, 318; 359/494, 500; 570/111, 113, 123, 127, 128, 129, 131, 141, 182, 183, 184, 185, 187, 188, 189

(56) References Cited

U.S. PATENT DOCUMENTS

| | | | | |
|---|---|---|---|---|
| 4,198,349 A | * | 4/1980 | Nuss et al. | ..................... 560/35 |
| 4,323,675 A | * | 4/1982 | Eckes et al. | ........... 252/301.22 |
| 4,666,819 A | | 5/1987 | Elmasry | |
| 5,064,264 A | * | 11/1991 | Ducharme et al. | ............. 359/4 |
| 5,120,876 A | * | 6/1992 | Cheng et al. | ................ 544/358 |
| 5,521,271 A | * | 5/1996 | Smith et al. | ................ 526/242 |
| 5,776,374 A | * | 7/1998 | Newsham et al. | .......... 252/582 |
| 5,783,120 A | | 7/1998 | Ouderkirk et al. | |
| 6,001,958 A | * | 12/1999 | Tapolsky et al. | ........ 428/423.1 |
| 6,067,186 A | | 5/2000 | Dalton et al. | |
| 6,084,702 A | | 7/2000 | Byker et al. | |
| 6,348,992 B1 | | 2/2002 | Zhang et al. | |
| 6,393,190 B1 | | 5/2002 | He et al. | |

FOREIGN PATENT DOCUMENTS

JP    06025120 A1  *  2/1994

OTHER PUBLICATIONS

Bosc et al.; Design and Synthesis of Low Refractive Index Polymers for Modulation in Optical Waveguides; Optical Materials vol. 13; 1999; pp. 205–209.
Chollett et al.; Electro–Optic Coefficient Determination in Stratified Organized Molecular Thin Films: Application to Poled Polymers; Thin Solid Films 242; 1994; pp. 132–138.
Holm, Roy T.; Ketimines as Latent Epoxy Curing Agents; Journal of Paint Technology; vol. 39, No. 509; Jun. 1967; pp. 385–388.
Inoue, K.; Functional Dendrimers, Hyperbranched and Star Polymers; Progress in Polymer Science; vol. 25, No. 4; May, 2000; pp. 453–571.
Marcatili, E.A.J.; Dielectric Rectangular Waveguide and Directional Coupler for Integrated Optics; The Bell System Technical Journal; vol. 48; Sep., 1969; pp. 2071–2102.
Teng et al.; Simple Reflection Technique for Measuring the Electro–Optic Coefficient of Poled Polymers, Appl. Phys. Lett.; vol. 56, No. 18; Apr. 30. 1990; pp. 1734–1736.

* cited by examiner

Primary Examiner—Robert Dawson
Assistant Examiner—Jeffrey B. Robertson
(74) Attorney, Agent, or Firm—Klaus H. Wisemann

(57) ABSTRACT

Functional optical materials for optical systems that are typically useful in optical waveguides, optical switching systems, optical modulators, optical computing systems and the like. Included are polymer systems and electrooptical chromophores. Polymers are thermoplastic and/or thermosetting polymers and are blended or co-polymerized with the electrooptic chromophore. The thermoplastic or thermosetting polymer selected from an acrylic/methacrylic, polyester, polyurethane, polyimide, polyamide, epoxy resin, or hybrid (organic-inorganic) or nanocomposite polyester polymer. The electrooptic chromophore is selected from a substituted aniline, substituted azobenzene, substituted stilbene, or substituted imine. Methods for improving adhesion promotion for the various novel materials are also provided.

26 Claims, 1 Drawing Sheet

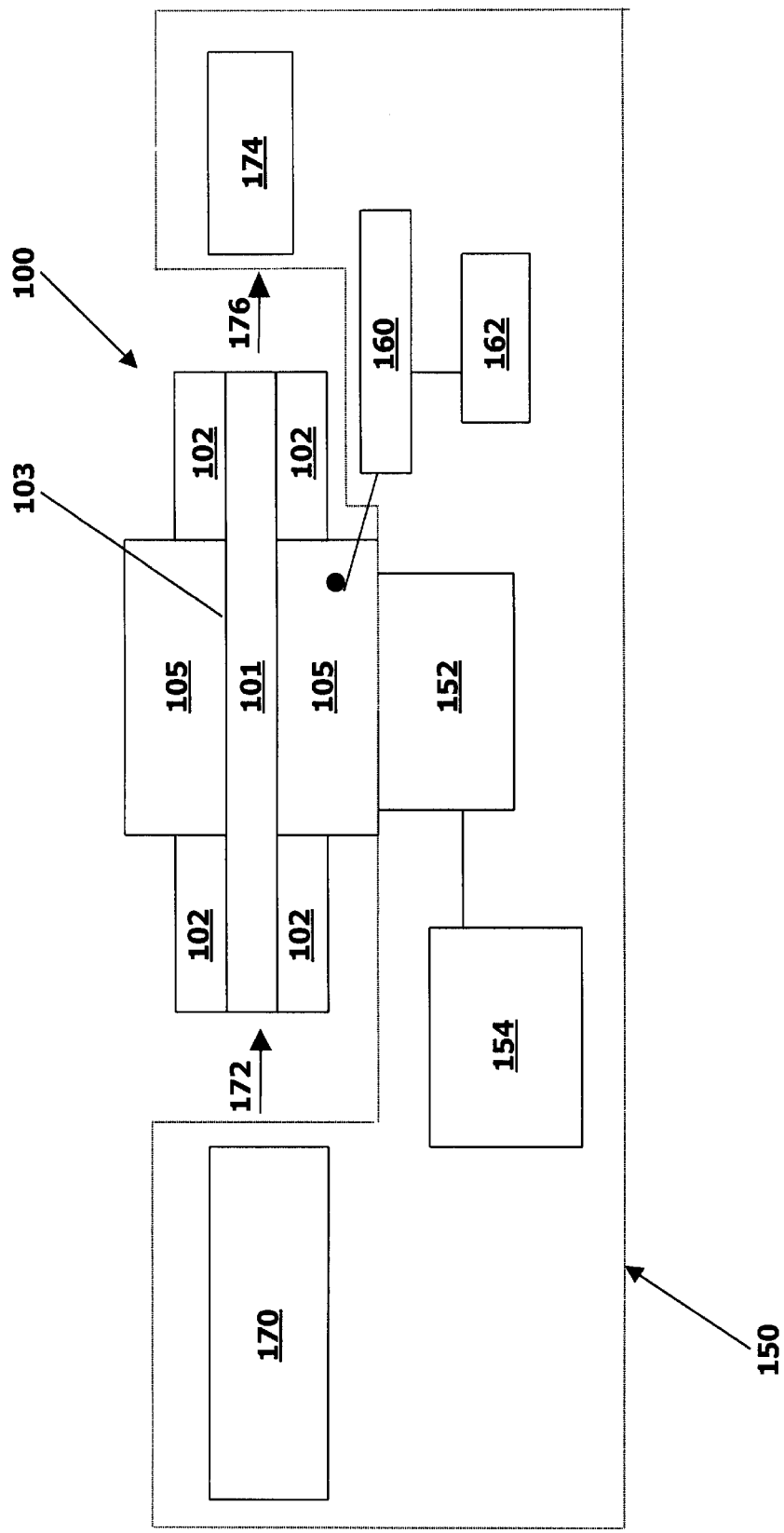

FUNCTIONAL MATERIALS FOR USE IN OPTICAL SYSTEMS

FIELD OF THE INVENTION

The field of this invention is functional materials useful in optical systems exemplified by, but not limited to, optical switches, modulators, and other devices that are compatible with silica or non-silica waveguides.

BACKGROUND OF THE INVENTION

A waveguide is any structure which permits the propagation of a wave through its length despite diffractive effects, and possible curvature of the guide structure. An optical waveguide is an optical structure capable of guiding a beam of laser light along light channels in the waveguide, and is defined by an extended region of increased index of refraction relative to the surrounding medium. The waveguide typically includes both the light channels in which light waves propagate in the waveguide, and surrounding cladding which confine the waves in the channel. The strength of the guiding, or the confinement, of the wave depends on the wavelength, the index difference, and the guide width.

Discrete control of the refractive index of a given polymer is necessary for creating silica or non-silica waveguide optical switch components; however, it is not the only property which determines the durability and efficiency required for a commercial product. The present invention demonstrates that there is a critical interplay between the polymer, the silica substrate, the electrodes and the electrooptic material which must be elucidated to create a commercially viable product.

Bosc et al., describes the use of two fluorinated monomers (1H, 1H, 2H, 2H tridecafluoro-octyl methacrylate and trifluoroethyl methacrylate) to create copolymers having refractive index values between 1.370 and 1.403 at 1.3 um (*Design and Synthesis of Low Refractive Index Polymers for Modulation in Optical Waveguides*, Optical Materials Vol 13 (1999), pp. 205–209). Bosc et al. further discuss copolymerization of an electro-optic monomer, methacrylic acid ester of Disperse Red 1 (the refractive index for a homopolymer of this material is 1.710). These monomers were blended to achieve a final terpolymer refractive index of 1.5. The Tg of these systems varied between 82° C. and 92° C. While these compositions allow (possess) some degree of optical modulation, they are not suitable for use in an optical switch which meets the reliability and efficiency requirements of commercial communications networks.

BRIEF DESCRIPTION OF THE INVENTION

These and other deficiencies of the prior art are overcome by the present invention, which provides both polymer systems and electrooptic chromophores that form the components of a optical devices such as optical switches or modulators and other devices useful in an optical waveguide.

The polymer component is a thermoplastic or thermosetting polymer which is blended or co-polymerized with an electrooptic chromophore. The thermoplastic or thermosetting polymer is typically selected from the group consisting of acrylics/methacrylics, polyesters, polyurethanes, polyimides, polyamides, polyphosphazenes, epoxy resins, and hybrid (organic-inorganic) or nanocomposite polyester polymers. Combinations of thermoplastic and thermosetting polymers (interpenetrating polymer networks) are also envisioned as part of this invention.

Additionally, the thermoplastic and/or thermosetting polymer typically has a glass transition temperatures above 100° C., one embodiment for low index materials has a refractive index values less-than 1.5 while another embodiment for high index materials has refractive index values greater than 1.5. The polymers are combined with chromophores, either as part of the backbone chain or blended and typically contain compatibilization additives or groups and/or adhesion promotion additives or groups. The electrooptic chromophore according to the invention is typically a substituted aniline, substituted azobenzene, substituted stilbene, or substituted imine with one or more as further defined below.

BRIEF DESCRIPTION OF THE DRAWING

The Drawing illustrates a schematic for one embodiment of the invention where a material according to the invention is used to control light passing through a fiber optic waveguide in response to temperature changes.

DETAILED DESCRIPTION OF THE INVENTION AND BEST MODE

A functional optical material is any optical material that changes its index of refraction or other selected optical property in response to its environment. Examples of changes in the environment include but are not limited to changes in an electrical field, changes in a magnetic field, changes in temperature, changes in pressure.

This invention broadly discloses functional optical materials and/or their applications that relate to optically active chromophores. An optically active chromophore is any molecule or chemical group which changes its index of refraction or produces a change in the index of refraction of a compound or composition containing it, upon a change in the environmental conditions in which it is placed. More specifically, the invention discloses compounds and/or their uses that relate to electrooptic chromophores, thermooptic chromophores and magnetooptic chromophores. Electrooptic chromophore—any molecule or chemical group which changes its refractive index or produces a change in the refractive index of a compound or composition containing it upon application of an electric field. Thermooptic chromophore—any molecule or chemical group which changes its refractive index or produces a change in the refractive index of a compound or composition containing it upon a change in temperature. Magnetooptic chromophore—any molecule or chemical group which changes its refractive index or produces a change in the refractive index of a compound or composition containing it upon application of a magnetic field.

The present invention provides both polymer systems and optically active chromophores that form the components in optical systems such as an optical switch useful for in an optical waveguide.

Precursor materials unless specifically labeled otherwise are in weight percent (wt. %). All measured index of refractions listed herein are measured at about 20° C., and at wavelengths at the Sodium d line, about 589 nm, unless labeled otherwise.

As used herein, "glass transition temperature" or $T_g$ refers to the temperature in a polymer at which a hardened polymer shows a transition toward more mobile polymer chains as evidenced by dielectric spectroscopy.

The term "backbone" or "polymer backbone" as used herein indicates the extended linear repeating chain of a polymer.

The typical molecular weight range (number average) of polymers of this invention is between about 5,000 to about 5,000,000. Preferably the polymers of the invention have a molecular weight range between about 7,000 to about 500,000. Most preferably, the polymers of this invention have a molecular weight range of about 10,000 to about 30,000.

I. Polymer Systems

The polymers of this invention are thermoplastic (i.e., melt-flow or are solvent soluble), thermosetting in nature (i.e., resist melting and are not soluble in solvents), or are a combination of thermoplastic and thermosetting polymers (interpenetrating polymer networks).

Additionally, the polymers of this invention typically have glass transition temperatures above 100° C. The refractive index values of these polymeric compositions typically vary between about 1.3 to about $\leq 1.5$ in one embodiment; and from about 1.5 to about 1.8 in a second embodiment. Typically, the polymers of the present invention can contain (part of the backbone structure) between 0.1 and 10% of an adhesive promotion group or combination of groups such as silane, carboxylic acid, nitrile, or hydroxyl functional groups. Additionally, all of the polymers can be either blended with an EO chromophore or can have the EO chromophore covalently attached to the polymer backbone structure.

Thermoplastic polymers are polymers that soften or become plastic when they are heated. The process of heating and cooling such polymers can be carried out repeatedly without affecting any appreciable change in the properties of the polymers. After thermoplastic polymers are synthesized, they can be dissolved in a solvent and applied to surfaces. Additionally, these polymers can be heated causing them to melt flow and generally develop strong adhesive bonds to a substrate.

Thermosetting polymers include polymer materials in which chemical reactions, including cross-linking, occur while the resins are being molded. The appearance and chemical and physical properties of the final product are entirely changed, and the product is resistant to further applications of heat (up to the charring point). The thermosetting polymers of the present invention are structurally defined as three dimensional crosslinked chains or polymeric network structures.

A primary difference between thermoplastic polymers and thermosetting polymers is that thermoplastic polymers are capable of melting and reflowing, and are soluble in solvents. Thermosetting polymers, after they are cured or crosslinked, are not soluble in solvents and will not reflow when heated. Combinations of thermoplastic and thermosetting polymers (interpenetrating polymer networks) are also envisioned as part of this invention.

The chemistry of thermoplastic and thermosetting polymer systems includes the following preferred materials and reactions;

(a) acrylic thermoplastic polymers containing functional groups (double bonds, epoxides, alcohols, acids) capable of entering into secondary chemical reactions that create three dimensional network structures that are solvent insoluble or will not melt and reflow upon heating;

(b) polyurethane polymers based on diisocyanates and multifunctional alcohols that react to create three dimensional network structures that are not soluble in solvents;

(c) polyesters that contain unsaturated sites in their backbone structure or contain acid/hydroxy functional groups that can be chemically reacted with other similar multifunctional crosslinking agents to create three dimensional network structures;

(d) epoxy resins that can be reacted with polyamides, polymercaptans or polyacids to create three dimensional structures; and (e) polyphosphazenes and polysiloxane systems can also be prepared to contain multiple vinyl unsaturation sites that can be cured with peroxides or other free radical addition initiation mechanisms to create three dimensional structures.

A broad embodiment of the invention includes the following:

A. For a low refractive index optical system (e.g. silica based optical waveguide systems): selecting and reacting one or more monomers having a low index of refraction (n<1.5); selecting and reacting zero, one, or more monomers having a high index of refraction (n$\geq$1.5), wherein the concentration of the monomer(s) with a high index of refraction is less than the concentration of monomer(s) having a low index of refraction; selecting and reacting zero, one or more optically active chromophores according to the invention, or zero, one, or more of conventional optical chromophores disclosed herein, with the proviso that at least one chromophore must be selected; selecting and reacting a compatibilizer according to the invention for the selected chromophore(s); and selecting and reacting one or more adhesion enhancers according to the invention. Typically, to obtain properties such as high $T_g$ while obtaining good optical properties, fluorinated monomers are mixed with nonfluorinated monomers. Additional materials to obtain selected properties such as electrical properties, flow control, water resistance and the like may be added.

B. For a high refractive index optical system (e.g. non-silica based optical waveguide systems): selecting and reacting one or more monomers having a high index of refraction (n$\geq$1.5) according to the invention; selecting and reacting zero, one, or more monomers having a low index of refraction (n<1.5) according to the invention (wherein the concentration of the monomer having a low index refraction is less than the monomer having a high index of refraction), selecting and reacting zero, one or more optically active conventional chromophores disclosed herein, or zero, one, or more of the optically active chromophores according to the invention; selecting and reacting one or more compatibilizers for the one or more chromophores; and selecting and reacting one or more adhesion enhancers according to the invention. Typically, to obtain properties such as high $T_g$ while maintaining good optical properties, fluorinated monomers are mixed with nonfluorinated monomers. Additional materials to obtain selected properties such as electrical properties, flow control, water resistance, and the like may be added.

The typical polymer systems or functional optical materials of the present invention are derived from selected combinations of the following materials:

(i) low refractive index monomers;

(ii) high refractive index monomers;

(iii) polar and nonpolar monomers;

(iv) optically active chromophores such as EO chromophores (conventional and those from this invention) that react with monomers of this invention or blend with the polymers of this invention;

(v) monomers that act as compatibilizers or solubilizers for optically active chromophores such as EO or thermooptic chromophores that are blended with the materials of this invention;

(vi) monomers that act as compatibilizers or solubilizers for optically active chromophores such as EO or thermooptic chromophores that react with monomers for forming polymers according to the invention;
(vii) adhesion promotion monomers (e.g., for glass and metal electrodes),
(viii) monomers that provide thermal stability
(ix) monomers that provide moisture resistance;
(x) monomers which increase or provide high Tg values (e.g., greater than 100° C.);
(xi) monomers capable of providing thermoplastic and thermosetting polymer structures;
(xii) monomers that allow for enhanced poling; and
(xiii) monomers that provide enhanced flow characteristics during formation of the final product.

The various examples provide herein include the methodology necessary to synthesize polymer systems which possess the durability and efficiency required for commercial optical systems such as optical switches, optical modulators, and other optical components that may be used in conjunction with silica or non-silica waveguides. As is described in more elsewhere herein, monomers and precursors that provide a low refractive index are preferred for silica based devices and monomers and precursors that provide a high refractive index are typically preferred for non-silica based devices. Silica based systems typically require a polymer system or polymer composition that has a refractive index of about 1.3 to about 1.5. Typically monomers and the quantity of the respective monomer are selected that will provide refractive indexes within this range in the final functional optical material. Typically for use with silica based optical systems and with optical systems that behave similarly to silica systems, monomers are selected from the group of monomers that produce homopolymers having a refractive index below 1.5. However, this may not always be the case as it is envisioned that small quantities of monomer from homopolymers having refractive indexes above about 1.5 may be incorporated as comonomers with the low refractive index (n<1.5) producing monomers to achieve specific effects in the final functional optical material (e.g. higher $T_g$, optically active chromophore compatibilization, shifted optical loss at specific wavelengths, better poling, adhesion, enhanced crosslinking, and the like). However, in silica based systems and systems having like properties, the majority of the monomer content will always be a majority of one or more monomers having low refractive indexes. Typically for use with non-silica based optical systems, monomers are selected from the group of monomers that produce homopolymers having a refractive index above about 1.5. However, this may not always be the case as it is envisioned that small quantities of monomer from homopolymers having refractive indexes below 1.5 may be incorporated as comonomers with the high refractive index producing monomers (n≧1.5) to achieve specific effects in the final functional optical material (e.g. higher $T_g$, optically active chromophore compatibilization, shifted optical loss at specific wavelengths, better poling, adhesion, enhanced crosslinking and the like). This methodology includes the combination of acrylic, methacrylic, styrene and other liquid or solid ethylenically unsaturated monomers.

Typically the optically active chromophores of the present invention, including fluorinated chromophores and those having primary as well as secondary electron withdrawing groups, are used with silica based optical systems. In some cases, the conventional chromophores may be used with low refractive index systems such as silica. Typically, the conventional EO chromophores as well as the chromophores of the present invention, may be used with non-silica based optical systems. Compatibilizers useful with EO chromophores of the present invention typically include nitrites, fluorinated esters, and fluorinated aromatics. Compatibilizers useful with conventional EO chromophores typically include nitrites, esters, and aromatics.

Electrooptic measurement techniques used in the present invention are described in *Electro-optic coefficient determination in Stratified Organized Molecular Thin Films. Application to Poled Polymers*, P. A. Chollet, et al; Thin Solid Films 242 (1994), 132–138; and *Simple Reflection Techniques for Measuring the Electro-optic Coefficient of Poled Polymers*, C. C. Teng and H. T. Man, Appl. Phys. Lett., Vol. 56. No. 18, (1990), 1734–1736.

The preferred polymers of the present invention can be prepared according to methods found in *Preparative Methods of Polymer Chemistry*, Sorenson and Campbell, Interscience Publishers, New York, N.Y. (1968), and include linear polymers, lightly branched linear polymers, and heavily branched linear polymers. The preferred thermoplastic polymers of the present invention include: acrylics/methacrylics (copolymers of esters of acrylic and methacrylic acid where the alcohol portion of the ester can be based on hydrocarbon or partially or fully fluorinated alkyl chains); polyesters (where the diacid or diol can contain carbon-hydrogen aliphatic, aromatic or carbon-fluorine functionality); polyurethanes (where the diisocyanate can be aliphatic or aromatic and the diol can contain carbon-hydrogen or carbon-fluorine functionality); polyimides where the acid, amine, or diamine can be partially or fully fluorinated; polyamides (where the diacid or diamine can contain carbon-hydrogen aliphatic, aromatic or carbon-fluorine functionality); polyphosphazenes (where the polyphosphazene backbone structure can contain fluorinated aromatic or aliphatic functional groups, as well as, carbon-hydrogen functionality); epoxy resin (where the epoxy resin can contain carbon-hydrogen or carbon-fluorine functionality) which can further be reacted with diacids or anhydrides (that also contain carbon-hydrogen or carbon-fluorine functionality); and hybrid (organic-inorganic) or nanocomposite polyester polymers (where the polyester component consists of aliphatic, aromatic carbon hydrogen or carbon-fluorine functionality and the inorganic components are based on silane or organometallic materials such as titanates, zirconates and other multivalent metal organics). The general chemical structures of these preferred polymers is as follows:

Acrylic (Polymers of Acrylic Acid Ester Monomers)

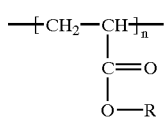

Copolymers of Acrylic Acid Esters, Methacrylic Acid Esters and Other Single Unsaturated Monomers

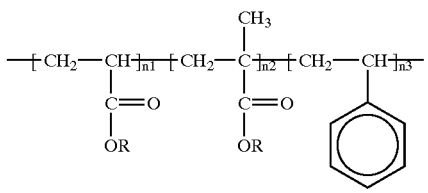

Polyesters

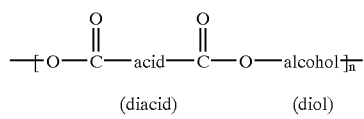

Polyurethanes

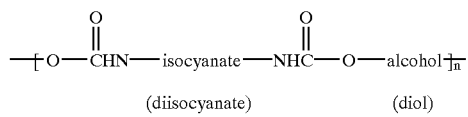

Polyimides

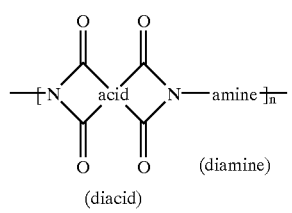

Polyamides

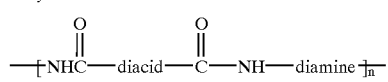

Polyphosphazenes

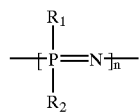

In Tables 1, 2 and 3 are listed a number of monomer systems that have low refractive index (n) values (n=about 1.33 to about 1.50) and high refractive index values (n=greater than about 1.50, preferably greater than about 1.50 to about 1.6.

TABLE 1

| Acrylate Monomers | |
|---|---|
| Name | Refractive index (at 20° C.) |
| Acid | 1.4202 |
| Allyl ester | 1.4320 |
| Anhydride | 1.4487 |
| Benzyl ester | 1.5143 |
| 4-Biphenylyl ester | |
| Bisphenol A ethoxylate diester | 1.5450 |
| Bisphenol A diglycidyl ether diester | 1.5570 |
| 2-Bromo- | |
| 3-Bromo-, cis- | |
| 2-Bromo-, ethyl ester | |
| 2-Bromoethyl ester | 1.4770 |
| 2-Bromomethyl- | |
| 2-Bromomethyl-, ethyl ester | 1.478 |
| 2-Bromomethyl-, methyl ester | 1.490 |
| 1,3-Butylene diester | 1.4500 |

TABLE 1-continued

| Acrylate Monomers | |
|---|---|
| Name | Refractive index (at 20° C.) |
| 1,4-Butylene diester | 1.4560 |
| 2-Butylene-1,4 diester | 1.4422 |
| 2-(2-Butoxyethoxy)ethyl ester | 1.4394 |
| 2-Butoxyethyl ester | 1.4323 |
| n-Butyl ester | 1.4180 |
| s-Butyl ester | 1.4140 |
| t-Butyl ester | 1.4108 |
| 2-Chloro- | |
| 2-Chloro-, butyl ester | |
| 2-Chloro-, ethyl ester | 1.4384 |
| 2-Choloro-, methyl ester | 1.4420 |
| 3-Chloro-, cis- | |
| 3-Chloro-, trans- | |
| 2-Chloroethyl ester | 1.4384 |
| Cinnamyl ester | 1.5660 |
| Crotyl ester | |
| 2-Cyano-, butyl ester | 1.4420 |
| 2-Cyano-, ethyl ester | |
| 2-Cyano-, isobutyl ester | |
| 2-Cyanoethyl ester | 1.4433 |
| Cyclohexyl ester | 1.4673 |
| Cyclopentyl ester | |
| n-Decyl ester | 1.440 |
| 2,3-Dibromopropyl ester | 1.5520 |
| 2,3-Dichloropropyl ester | 1.4765 |
| Dicyclopentenyl ester | |
| Dicyclopentenyloxyethyl ester | 1.5010 |
| 2-(Diethylamino)ethyl ester | 1.443 |
| 3-(Diethylamino)propyl ester | 1.441 |
| Di(ethylene glycol) diester | 1.4630 |
| Dihydrodicyclopentadienyl ester | 1.509 |
| 2,3-Dihydroxypropyl ester | |
| 2(Dimethylamino) ethyl ester | 1.4380 |
| 3-(Dimethylamino) neopentyl ester | 1.439 |
| 3-(Dimethylamino) propyl ester | 1.4400 |
| Dipentaerythritol pentaester | |
| Di(propylene glycol) diester | 1.4488 |
| Di(trimethylolpropane) tetraester | 1.4790 |
| Dodecyl ester | 1.4450 |
| 1H,1H,11H-Eicosafluoroundecylester | |
| 2-(2-Ethoxyethoxy)ethyl ester | 1.4390 |
| 2-Ethoxyethyl ester | 1.4282 |
| Ethyl ester | 1.4060 |
| Ethylene diester | 1.4610 |
| 2-Ethylhexyl ester | 1.4360 |
| Furfuryl ester | 1.4800 |
| Glycidyl ester | 1.4490 |
| Glycerol propoxylate triester | 1.4610 |
| 1H,1H,2H,2H-Heptadecafluorodecyl ester | 1.3380 |
| 1H,1H-Heptafluorobutyl ester | 1.3301 |
| Heptyl ester | 1.4311 |
| Hexadecyl ester | 1.4470 |
| 2,2,3,4,4,4-Hexafluorobutyl ester | 1.352 |
| 1H-Hexafluoroisoporpyl ester | 1.3190 |
| Hexanediol diester | 1.4562 |
| n-Hexyl ester | 1.4280 |
| 4-Hydroxybutyl ester | 1.4520 |
| 2-Hydroxyethyl ester | 1.4502 |
| 2-Hydroxy-3-phenoxypropyl ester | 1.5280 |
| 2-Hydroxypropyl ester | 1.4448 |
| Isobornyl ester | 1.4760 |
| Isobutyl ester | 1.4140 |
| Isodecyl ester | 1.4420 |
| Isooctyl ester | 1.4370 |
| Isopropoxyethyl ester | 1.4258 |
| Isopropyl ester | 1.4060 |
| Methallyl ester | 1.4372 |
| 2-(2-Methoxyethoxy) ethyl ester | 1.4392 |
| 2-Methoxyethyl ester | 1.4272 |
| Methyl ester | 1.4020 |
| 2-Methylbutyl ester | 1.4800 |
| 2-(N-Morpholino)ethyl ester | 1.4728 |
| 1-Naphthyl ester | |

TABLE 1-continued

Acrylate Monomers

| Name | Refractive index (at 20° C.) |
|---|---|
| 2-Naphthyl ester | |
| Neopentyl ester | |
| Neopentyl glycol diester | 1.4530 |
| Nonyl ester | 1.4375 |
| Octadecyl ester | |
| 1H,1H,5H-Octafluoropentyl ester | 1.3467 |
| n-Octyl ester | 1.4350 |
| 1H,1H-Pentadecafluorooctyl ester | 1.3279 |
| Pentaerythritol tetraester | 1.4870 |
| Pentaerythritol triester | 1.4840 |
| Pentaerythritol stearate diester | |
| 2,2,3,3,3-Pentafluoropropyl ester | 1.3363 |
| 1,5-Pentanediol diester | 1.4551 |
| n-Pentyl ester | 1.4240 |
| 2-Phenoxyethyl ester | 1.5180 |
| Phenyl ester | |
| 1,4-Phenylene diester | |
| 1,4-Phenylene di(acrylic acid) | |
| 2-Phenylethyl ester | |
| Trimethyl 2-phosphonoacrylate | 1.4540 |
| Propargyl ester | |
| n-Propyl ester | 1.4130 |
| 1,2-Propylene glycol diester | 1.4470 |
| 1,3-Propylene glycol diester | 1.4529 |
| Tetradecyl ester | 1.4468 |
| Tetra(ethylene glycol) diester | 1.4638 |
| 2,2,3,3-Tetrafluoropropyl ester | 1.3629 |
| Tetrahydrofurfuryl ester | 1.4580 |
| S,S'-Thiodi-1,4-phenylene dithiol diester | |
| 2,3,3-Trichloro- | |
| Tridecyl ester | |
| Tri(ethylene glycol) diester | 1.4609 |
| 2,2,2-Trifluoroethyl ester | 1.3506 |
| 1,1,1-Tri(2-hydroxyethoxy-methyl)propane triester | 1.4710 |
| Tri(2-hydroxyethyl) isocyanurate triester | |
| 3,5,5-Trimethylcyclohexyl ester | 1.455 |
| 3,5,5-Trimethylhexyl ester | 1.4370 |
| Trimethylolpropane triester | 1.4736 |
| Trimethylolpropane ethoxylate triester | 1.4720 |
| Tri(propylene glycol) diester | 1.4500 |
| Vinyl ester | 1.4320 |

TABLE 2

Methacrylate Monomers

| Name | Refractive index (at 20° C.) |
|---|---|
| Acid | 1.432 |
| 2-(Acetonacetoxy)ethyl ester | 1.4560 |
| Allyl ester | 1.4360 |
| Anhydride | 1.454 |
| 2-(1-Aziridinyl)ethyl ester | |
| Benzyl ester | 1.5120 |
| Bisphenol A diester | |
| Bisphenol A tetraethozylate diester | 1.5320 |
| 2-Bromoethyl ester | |
| 1,3-Butylene diester | 1.4520 |
| 1,4-Butylene diester | 1.4565 |
| 2-Butoxyethyl ester | 1.4335 |
| n-Butyl ester | 1.4230 |
| s-Butyl ester | 1.4195 |
| Tert-Butyl ester | 1.4150 |
| N-tert-Butyl-2-aminoethyl ester | 1.4420 |
| 2-Chloro-2-hydroxypropyl ester | 1.4750 |
| 2-Chloroethyl ester | |
| Chloromethyl ester | 1.4434 |

TABLE 2-continued

Methacrylate Monomers

| Name | Refractive index (at 20° C.) |
|---|---|
| Cinnamyl ester | |
| Chloride | 1.4420 |
| 2-Cyanoethyl ester | 1.4459 |
| 1,4-Cyclohexanediol diester | |
| Cyclohexyl ester | 1.459 |
| Decanediol diester | 1.4577 |
| Decyl ester | 1.443 |
| 2,3-Dibromopropyl ester | |
| 2-(Dibutylamino)ethyl ester | 1.4474 |
| Dicyclopentenyl ester | 1.4990 |
| Dicyclopentenyloxyethyl ester | 1.4970 |
| 2-(Diethylamino) ethyl ester | 1.4442 |
| 3-(Dimethylamino) propyl ester | |
| Di(Ethylene glycol) diester | 1.4580 |
| 3,4-Dihydroxybutyl ester | |
| 2,3-Dihydroxypropyl ester | |
| 2-(Dimethylamino) ethyl ester | 1.4400 |
| Diurethane diester (isomers) | 1.485 |
| 1H,1H,7H-Dodecafluoroheptyl ester | |
| Dodecanediol diester | |
| Dodecyl ester | 1.4450 |
| 2,3-Epithiopropyl ester | |
| 2,3-Epoxybutyl ester | 1.4422 |
| 3,4-Epoxybutyl ester | 1.4472 |
| 2,3-Epolyopropyl ester | 1.4490 |
| 4-Ethoxybutyl ester | 1.4223 |
| 2-Ethoxyethyl ester | 1.4290 |
| Ethyl ester | 1.4130 |
| Ethyl 2-bromomethyl- ester | 1.4790 |
| 2-Ethylbutyl ester | |
| 1,2-Ethylene diester | 1.4540 |
| 2-Ethylhexyl ester | 1.4380 |
| 2-(Ethylthio)ethyl ester | |
| Ethyl 2-(trimethoxysilylmethyl-) ester | 1.4380 |
| Furfuryl ester | 1.4820 |
| Glycerol diester | 1.4720 |
| Glycerol triester | |
| Glycidyl ester | 1.4490 |
| 1H,1H,2H,2H-Heptadeca-fluorodecyl ester | |
| 1H,1H-Heptafluorobutyl ester | 1.3410 |
| Heptyl ester | |
| 1,6-Hexanediol diester | 1.4580 |
| 2,2,3,4,4,4,-Hexafluorobutyl ester | 1.3610 |
| 1H-Hexafluoroisopropyl ester | 1.3310 |
| Hexyl ester | 1.432 |
| 4-Hydroxybutyl ester | |
| 2-Hydroxyethyl ester | 1.4520 |
| 3-(5-Hydroxypentyloxy)-3- oxopropyl ester | |
| 3-Hydroxyporopyl ester | 1.4470 |
| Isobornyl ester | 1.4770 |
| Isobutyl ester | 1.420 |
| 2-Isocyanatoethyl ester | |
| Isodecyl ester | 1.4430 |
| Isopropyl ester | 1.4122 |
| Metallyl ester | |
| 2-(2-Methoxyethoxy) ethyl ester | 1.4397 |
| 2-Methoxyethyl ester | 1.4310 |
| Methyl ester | 1.4140 |
| 2-Methyl-2-nitropropyl ester | 1.450 |
| 2-(Methylthio) ethyl ester | 1.4800 |
| Methyl 2-bromomethyl ester | 1.4900 |
| Methyl 2-(1-hydroxyethyl-)ester | 1.4520 |
| 2-N-Morpholinoethyl ester | |
| Neopentylglycol diester | 1.4530 |
| Nona(ethylene glycol) diester | 1.4660 |
| Nona(propylene glycol)diester | 1.4520 |
| Nonyl ester | 1.4660 |
| 4-Nonylphenyl ester | 1.5020 |
| n-Octyl ester | 1.4373 |
| Pentabromophenyl ester | |
| Pentachlorophenyl ester | |
| 1H,1H-Pentafluorooctyl ester | |
| Pentaerythritol tetraester | |

TABLE 2-continued

Methacrylate Monomers

| Name | Refractive index (at 20° C.) |
|---|---|
| 2,2,3,3,3-Pentafloropropyl ester Pentyl ester | 1.3482 |
| 2-Phenoxyethyl ester | 1.5130 |
| Phenyl ester | 1.5184 |
| 2-Phenylethyl ester | 1.508 |
| n-Propyl ester | 1.4450 |
| 1,2-Propylene diester | 1.4450 |
| 1,3-Propylene diester | |
| 2-Sulfoethyl ester | 1.4772 |
| 3-Sulfopropyl ester, potassium salt | |
| Tetra(ethylene glycol) diester | 1.4630 |
| 2,2,3,3-Tetrafluoropropyl ester | 1.3730 |
| Trimethylsilyl ester | 1.4147 |
| 2-(Trimethylsilyloxy)ethyl ester | 1.4280 |
| 3-(trimethylsilyloxy)propyl ester | 1.4310 |
| 3-(Tris(trimethylsilyloxy)silyl) propyl ester | 1.4190 |
| Vinyl ester | 1.4360 |

TABLE 3

Other Ethylenically Unsaturated Liquid or Solid Monomers

| Monomers | Refractive Index (at 20° C.) |
|---|---|
| Styrene | 1.5470 |
| α, β Difluorostyrene | 1.506 |
| 1, 2 Difluorostyrene | 1.4990 |
| 2, 6 Difluorostyrene | 1.4990 |
| Monofluorostyrene | 1.51 |
| Trifluoromethylstyrene | 1.46–1.47 |
| Pentafluorostyrene | 1.446 |
| Vinyl acetate | 1.3950 |
| Vinyl trifluroethylacetate | 1.3170 |
| Vinyl ethers | 1.37–1.52 |
| Vinyl amides | 1.48–1.51 |
| Vinyl esters | 1.31–1.55 |
| Butenes and butadiene | 1.37–1.57 |
| Maleate/fumarate esters | 1.4–1.49 |
| Acrolein | 1.4025 |
| Acryl and methacrylamides | 1.41–1.51 |
| Allyl monomers | 1.38–1.56 |

The following table, Table 4, lists limits typical of the compositions and polymers described in Tables 5, 6, and 13.

TABLE 4

Critical Limits for Polymers

| | |
|---|---|
| Polymer low refractive index range | $1.3 < n < 1.5$ |
| Polymer high refractive index range | $1.5 \leq n < 1.8$ |
| Water Moisture Sensitivity | less than 2% water absorption by the polymer in a 24 hour water immersion test at room temperature. |
| Ease of poling | less than 100 volts per micron of film thickness |
| Thermal stability | less than 10% weight loss at 200° C. |
| Adhesion | better than about 90% crosshatch adhesion to any given substrate (ASTM D3359-78) |
| Optical Clarity | less than 5% by weight hydrogen in the monomer repeat unit of the polymer, and other units of the polymer. |
| EO Chromophore compatability | less than 1% weight loss or phase separation of the EO chromophore in the polymer matrix. |

POLYMER EXAMPLE 1

Prior Art Polymer

The exact co-polymer system 1H, 1H, 2H, 2H Tridecafluoro-octylmethacrylate (48.5%), trifluoroethyl-methacrylate (19.4%)(monomer, n=1.361), methacrylic acid ester of Disperse Red-1 (32.1%) (conventional chromophore) described in Bosc et al. was prepared and tested for its potential of creating a practical commercial communications optical switch device. The test results for this prior art system are given in Table 5. Descriptions of the results in each of the testing criteria follow Table 5.

TABLE 5

Analysis of Prior Art Terpolymer

| Refractive Index | Tg | Optical loss | Thermal stability/ {cross-linking capability} | Water/ Moisture Sensitivity | Ease of Poling | Adhesion | EO (conventional) Chromophore Compatibility | Control of Total System Refractive Index |
|---|---|---|---|---|---|---|---|---|
| Low (n = 1.5) | Less than 100° C. (373° K) | Poor | Poor/ {none} | Poor | Poor | Poor | Poor | Poor |

Regarding optical loss, the electrooptic (EO) chromophore and monomer has a high percentage of carbon-hydrogen bonds, which can cause high optical losses at 1.3 um wavelengths of light (communication requirements).

Regarding thermal stability, the low Tg for this copolymer system (84° C.) allows the material to melt on flow above 100–130° C. This system is not crosslinked and is thermoplastic in its nature and thus can melt/flow at high temperatures. The low thermal stability of this polymer also limits the ability of the polymer to maintain its poling capabilities over a long time period.

Regarding moisture sensitivity, copolymer films containing gold electrodes and on quartz or ITO coated quartz substrates were easily removed or debonded either by water immersion or subjection to 85% RH/85° C. environmental exposure conditions.

Regarding ease of poling, this copolymer had a tendency to breakdown (form pinholes) and short out the electrodes under a wide range of DC voltage poling conditions.

Regarding adhesion, this copolymer could be easily removed from quartz substrates using a scratch or cut/tape adhesion test.

Regarding EO chromophore compatibility, a common electrooptic (EO) chromophore such as Disperse Red 1 is not soluble or compatible in the copolymer compositions disclosed in the prior art. Copolymerization of all carbon-hydrogen monomer of Disperse Red 1 does allow one to put in a small amount (less than 50%) of the EO chromophore but over time/temperature this copolymerized EO chromophores can segregate away from the copolymer and lower its EO efficiency and optical clarity (increased optical loss).

Regarding control of total system refractive index, the conventional electrooptic (EO) chromophore has a very high inherent refractive index value. For this reason higher concentrations of the EO chromophore raises the entire refractive index value of the total system to where it is no longer efficient for optical switching in a silica waveguide or other applications requiring low refractive index values. In order to reduce the overall refractive index of the system one needs to use a lower concentration of the conventional EO chromophore, which reduces the overall switching capability or efficiency of the entire system.

The development of a practical and robust (durable) polymer system for silica waveguide optical switch communications components requires the following elements:
(a) control of the overall refractive index of the total system (n<1.5);
(b) control of the Tg and crosslinking capability of the total system;
(c) control of the optically active chromophore compatibility and low optical loss (low numbers of C—H bonds) of the system;
(d) inherent water resistance and strong adhesive bonding capabilities for silica and metal (gold, silver, aluminum, nickel, etc.) electrode substrates; and
(e) a total system designed for enhanced poling capabilities, high dielectric strength and breakdown resistant capabilities.

The first step in this embodiment of the present invention is the selection of low or refractive index monomers as exemplified in Tables 1, 2, and 3 (refractive index adjustment or control), and in Table 8 where the monomer of a homopolymer having appropriate properties can be selected. The monomers, and monomers of homopolymers listed in these tables are meant to be exemplary and are not to be construed as a limitation on the invention. Other monomers, not listed in the tables that possess the properties required by the present invention may also be used. When monomers are mixed, the refractive index of the multi-component polymer is controlled by altering the fractional amount of each monomer contained in the polymer. The refractive index of the multi-component polymer can be made to vary smoothly between the lowest refractive index of a homopolymer formed from any one component and the highest refractive index of a homopolymer formed from any other component.

POLYMER EXAMPLE 2

Novel Thermoplastic Polymer

As an example for this embodiment, a low refractive index monomer selected was trifluoroethylmethacrylate (n=1.361). The next monomers selected (acrylonitrile, methylmethacrylate, {pentafluorostyrene in Polymer Example 3}) were used to compatabilize a conventional (all carbon hydrogen bonds) EO chromophore (meta-nitroaniline or Disperse Red-1) and to raise the Tg of the total system. The next monomer selected was methacryloxypropyltrimethoxysilane which can promote adhesion to silica or Indium tin oxide coatings.

The multi-monomer thermoplastic polymer of this invention was prepared in the following manner (all in wt. %):

60% of trifluoroethylmethacrylate monomer (n=1.361) was combined with 30% methylmethacrylate monomer (n=1.49),
8% acrylonitrile (compatibility promoter for the chromophore) and 2% of the methacryloxypropyltrimethoxysilane (adhesion promoter). This liquid monomer mixture (25 cc) was added slowly to 200 mls of dry tetrahydrofuran (THF) contained in a 400 ml round bottom 3 neck flash fitted with a heating mantle, glass shaft stirrer, reflux condenser and addition funnel. To the monomer mixture was added 0.5 grams of Vazo 64™ (free radical initiator from E. I. DuPont DeNemours, Wilmington, Del., USA) and the entire mixture heated in the THF at 68° C. over a 1 hour time period. The reaction was continued over an 8 hour time period after which the THF/polymer solution was cooled to room temperature and the polymer precipitated out of the solution with excess methanol. The resulting polymer had a refractive index value below 1.5 and a Tg value greater than 100° C.

To this polymer was added 10% by weight of a conventional EO chromophore (metanitroaniline or Disperse Red-1) or an EO chromophore of this invention (4-fluoro-3-nitroaniline)in dioxane (1–5% solids) and spun down onto Indium Tin Oxide (ITO) coated glass or silica substrates. This system was metalized and poled in a similar manner as Polymer Example 1. See, for example, *Electro-optic coefficient determination in Stratified Organized Molecular Thin Films: Application to poled polymers*, P. A. Chol let, et al; Thin Solid Films 242: 132–138 (1994); and, *Simple reflection techniques for measuring the electro-optic coefficient of poled polymers*, C. C. Teng and H. T. Man, Appl. Phys. Lett., Vol. 56 No. 18: 1734–1736 (1990).

The poling and dielectric strength capabilities for this particular copolymer was superior (less pinholes, defects and electrical shorting) to the prior art example discussed previously. This copolymer was analyzed in the same fashion as the prior art polymer in Polymer Example 1. The data from this analysis is given in Table 6.

TABLE 6

Novel Thermoplastic Polymer (Polymer Example 2)

| Refractive Index | Tg | Optical Loss | Thermal Stability {crosslinking capability} | Water/moisture Sensitivity | Ease of Poling | Adhesion | EO (conventional Chromophore compatibility) {Non Conventional EO Chromophore compatability} | Control of Total Sytem Refractive Index |
|---|---|---|---|---|---|---|---|---|
| Low n < 1.5 | 100 °C.> | Low | acceptable {none} | Good | Good | Excellent | Good {excellent} | good |

This novel polymer had a Tg>100° C. and thus was not as susceptible to thermal stress as the prior art polymer system. The addition of crosslinking capability greatly improved the overall thermal stability of the system. Additionally, this polymer has excellent water resistance and excellent adhesion to silica surfaces, indium tin oxide coatings and gold electrodes. Both the nitrile and silane functional groups in the polymer are responsible for adhesion.

The nitrile functional group in the polymer and the hydrocarbon ester increased the solubility (up to 10%) of the conventional EO chromophore but the fluorine containing EO chromophores of this invention could be put into this polymer up to a 30% or greater loading while still maintaining the overall is low refractive index for the total system.

POLYMER EXAMPLE 3

Novel Thermoplastic Polymers

Another embodiment of this invention includes, a copolymer system prepared in a manner similar that in Polymer Example 2, but here the methylmethacrylate monomer was replaced with pentafluorostyrene monomer (n=1.446). This particular system had even greater water resistance and adhesion than Polymer Example 2, while still maintaining EO response capabilities with conventional EO chromophores, or EO chromophores of the present invention.

A number of other homopolymer and copolymers were prepared in a similar manner as the previous examples and their compositions and general properties summarized in Table 7.

TABLE 7

Thermoplastic Polymers Useful with this Invention

| Sample Number | Monomers | Concentration (gm) | Product | General Property Comments |
|---|---|---|---|---|
| 1 | Trifluoroethyl Acrylate | 25 | Homopolymer | Low n, low Tg |
| 2 | Trifluoroethylmethacrylate | 17 | Copolymer | Low n, good adhesion |
|   | Acrylonitrile | 5 | | |
| 3 | Trifluoroethylmethacrylate | 8 | Copolymer | Low n, poor adhesion |
|   | Methylmethacrylate | 5 | | |
| 4 | Trifluoroethylmethacrylate | 11 | Copolymer | n = Approx. 1.5, good adhesion and good water resistance |
|   | Methylmethacrylate | 11 | | |
|   | Acrylonitrile | 2.5 | | |
|   | Trimethoxysilylpropylmethacrylate | 0.5 | | |
| 5,7* | Trifluoroethylmethacrylate | 4 | Copolymer | n = <1.49, high water sensitivity |
|   | Methylmethacrylate | 10 | | |
| 6 | Trifluoroethylmethacrylate | 9 | Homopolymer | Low n, poor adhesion |

Table 8 provides a list of homopolymer systems compatible with the methodology of the present invention (see Polymer Example 3). These homopolymer systems have low n values (about 1.3 to <1.50); and high n values (n≧1.5). Additionally, Table 8, lists glass transition (Tg) values (° K) for these homopolymers, as well as providing comments regarding a given homopolymer's polarity, adhesion bonding capabilities and water sensitivity.

TABLE 8

HomoPolymer System Properties

| Polymer | Refractive Index (n) | Glass Transition Temperature (Tg) (° K) | Comments |
|---|---|---|---|
| Poly(pentadecafluorooctyl acrylate) | 1.339 | 256 | |
| Poly(tetrafluoro-3-(heptafluoropropoxy)propyl acrylate | 1.346 | | |
| Poly(tetrafluoro-3-(pentafluoroethyoxy)propyl acrylate) | 1.348 | | |
| Poly(undecafluorohexyl acrylate) | 1.356 | 234 | |
| Poly(nonafluoropentyl acrylate) | 1.360 | | |
| Poly(tetrafluoro-3-(trifluoromethyoxy)propyl acrylate) | 1.360 | | |
| Poly(pentafluorovinyl propionate) | 1.364 | | |
| Poly(heptafluorobutyl acrylate) | 1.367 | 330 | |

TABLE 8-continued

HomoPolymer System Properties

| Polymer | Refractive Index (n) | Glass Transition Temperature (Tg) (° K) | Comments |
|---|---|---|---|
| Poly(trifluorovinyl acetate) | 1.375 | | |
| Poly(octafluoropentyl acrylate) | 1.380 | 238 | |
| Poly(pentafluoropropyl acrylate | 1.385 | | |
| Poly(2-heptafluorobutoxy)ethyl acrylate) | 1.390 | | |
| Poly(2,2,3,4,4,4-hexafluorobutyl acrylate) | 1.392 | 251 | |
| Poly(trifluoroethyl acrylate) | 1.407 | 263 | |
| Poly(2-(1,1,2,2-tetrafluoroethyoxy)ethyl acrylate | 1.412 | | |
| Poly(trifluoroisopropyl methacrylate) | 1.4177 | 354 | |
| Poly(2-trifluoroethyoxy)ethyl acrylate | 1.4185 | | |
| Poly(trifluoroethyl methacrylate) | 1.437 | | |
| Poly(vinyl-isobutyl ether) | 1.4507 | | |
| Poly(vinyl ethyl ether) | 1.4540 | | |
| Poly(vinyl butyl ether) | 1.4563 | | |
| Poly(vinyl pentyl ether) | 1.4581 | | |
| Poly(vinyl hexyl ether) | 1.4591 | | |
| Poly(4-fluoro-2-trifluoromethylstyrene) | 1.46 | | |
| Poly(vinyl octyl ether) | 1.4613 | | |
| Poly(vinyl-2-ethylhexyl ether) | 1.4626 | | |
| Poly(vinyl decyl ether) | 1.4628 | | |
| Poly(2-methoxyethyl acrylate) | 1.463 | | |
| Poly(butyl acrylate) | 1.4631 | 219 | |
| | 1.466 | | |
| Poly(tert-butyl methacrylate) | 1.4638 | 391 | |
| Poly(vinyl dodecyl ether) | 1.4640 | | |
| Poly(3-ethoxypropyl acrylate) | 1.465 | | |
| Poly(vinyl propionate) | 1.4665 | | |
| Poly(vinyl acetate) | 1.4665 | | a, c |
| Poly(vinyl methyl ether) | 1.467 | | a, c |
| Poly(ethyl acrylate) | 1.4685 | | |
| Poly(vinyl methyl ether) (isotactic) | 1.47–1.48 | | a, c |
| Poly(3-methoxypropyl acrylate) | 1.4700 | | |
| Poly(2-ethoxyethyl acrylate | 1.471 | | a, c |
| Poly(methyl acrylate) | 1.471 | 283 | |
| Poly(isopropyl methacrylate) | 1.472–1.480 | 354 | |
| Poly(vinyl sec-butyl ether) (isotactic) | 1.4740 | | |
| Poly(dodecyl methacrylate) | 1.4740 | 208 | |
| Poly(tetradecyl methacrylate) | 1.4746 | 201 | |
| Poly(hexadecyl methacrylate) | 1.4750 | 288 | |
| Poly(vinyl formate) | 1.4757 | | |
| Poly(2-fluoroethyl methacrylate) | 1.4768 | | |
| Poly(isobutyl methacrylate) | 1.477 | 326 | |
| Poly(n-hexyl methacrylate) | 1.4813 | 268 | |
| Poly(n-butyl methacrylate) | 1.483 | 293 | |
| Poly(ethylene dimethacrylate) | 1.4831 | | |
| Poly(2-ethoxyethyl methacrylate) | 1.4833 | | |
| Poly(oxyethyleneoxymaleoyl)(poly(ethylene maleate) | 1.4840 | | |
| Poly(n-propyl methacrylate) | 1.484 | 308 | |
| Poly(3,3,5-trimethylcyclohexyl methacrylate) | 1.485 | | |
| Poly(ethyl methacrylate) | 1.485 | 338 | |
| Poly(2-nitro-2-methylpropyl methacrylate) | 1.4868 | | |
| Poly(triethylcarbinyl methacrylate) | 1.4889 | | |
| Poly(1,1-diethypropyl methacrylate) | 1.4889 | | |
| Poly(methyl methacrylate) | 1.4893 | 373 | |
| Poly(ethyl glycolate methacrylate) | 1.4903 | | |
| Poly(3-methylcyclohexyl methacrylate) | 1.4947 | | |
| Poly(cyclohexyl α-ethoxyacrylate) | 1.4969 | | |
| Poly(4-methylcyclohexyl methacrylate) | 1.4975 | | |
| Poly(decamethylene glycol dimethacrylate) | 1.4990 | | b |
| Poly(2-bromo-4-trifluoromethylstyrene) | 1.5 | | |
| Poly(sec-butyl α-chloroacrylate) | 1.500 | | |
| Poly(ethyl α-chloroacrylate) | 1.502 | | |
| Poly(2-methylcyclohexyl methacrylate) | 1.5028 | | |
| Poly(bornyl methacrylate) | 1.5059 | | |
| Poly(ethylene glycol dimethacrylate) | 1.5063 | | b |
| Poly(cyclohexyl methacrylate) | 1.5066 | 377 | |
| Poly(cyclohexanediol- 1,4-dimethyacrylate) | 1.5067 | | b |
| Poly(tetrahydrofurfuryl methacrylate) | 1.5096 | | |
| Poly(1-methylcyclohexyl methacrylate) | 1.5111 | | |
| Poly(2-hydroxyethyl methacrylate) | 1.5119 | 358 | a, b, c |
| Poly(vinyl chloroacetate) | 1.512 | | |
| Poly(vinyl methacrylate) | 1.5129 | | |

TABLE 8-continued

HomoPolymer System Properties

| Polymer | Refractive Index (n) | Glass Transition Temperature (Tg) (° K) | Comments |
|---|---|---|---|
| Poly(N-butyl methacrylamide) | 1.5135 | | |
| Poly(methyl α-chloroacrylate) | 1.517 | | |
| Poly(2-chloroethyl methacrylate) | 1.517 | | |
| Poly(2-diethylaminoethyl methacrylate) | 1.5174 | | a, c |
| Poly(2-chlorocyclohexyl methacrylate) | 1.5179 | | |
| Poly (allyl methacrylate) | 1.5196 | | b |
| Poly(methyl isopropenyl ketone) | 1.5200 | | |
| Poly(ester) resin, rigid (ca. 50% styrene) | 1.523–1.54 | | b |
| Poly(N-2-methoxyethyl) methacrylamide) | 1.5246 | | |
| Poly(acrylic acid) | 1.527 | 379 | a, b, c |
| Poly(1,3-dichloropropyl methacrylate) | 1.5270 | | |
| Poly(2-chloro-1-(chloromethyl)ethyl methacrylate) | 1.5270 | | |
| Poly(acrolein) | 1.529 | | |
| Poly(1-vinyl-2-pyrrolidone) | 1.53 | | a, c |
| Poly(cyclohexyl α-chloroacrylate) | 1.532 | | |
| Poly(2-chloroethyl α-chloroacrylate) | 1.533 | | |
| Poly(2-aminoethyl methacrylate) | 1.537 | | a, c |
| Poly(furfuryl methacrylate) | 1.5381 | | |
| Poly(butylmercaptyl methacrylate) | 1.5390 | | |
| Poly(1-phenyl-n-amyl methacrylate) | 1.5396 | | |
| Poly(N-methyl-methacrylamide) | 1.5398 | | |
| Poly(sec-butyl α-bromoacrylate) | 1.542 | | |
| Poly(cyclohexyl α-bromoacrylate) | 1.542 | | |
| Poly(2-bromoethyl methacrylate) | 1.5426 | | |
| Poly(ethylmercaptyl methacrylate) | 1.547 | | |
| Poly(N-allyl methacrylamide) | 1.5476 | | b |
| Poly(1-phenylethyl methacrylate) | 1.5487 | | |
| Poly(vinylfuran) | 1.55 | | |
| Poly(2-vinyltetrahydrofuran) | 1.55 | | a, c |
| Poly(p-methyoxybenzyl methacrylate) | 1.552 | | |
| Poly(isopropyl methacrylate) | 1.552 | | |
| Poly(p-isopropylstyrene) | 1.554 | | |
| Poly(p,p-xylylenyl dimethacrylate) | 1.5559 | | b |
| Poly(1-phenylallyl methacrylate) | 1.5573 | | b |
| Poly(p-cylcohexylphenyl methacrylate) | 1.5575 | | |
| Poly(2-phenylethyl methacrylate) | 1.5592 | | |
| Poly(1-(0-chlorophenyl)ethyl methacrylate | 1.5624 | | |
| Poly(styrene-co-maleic anhydride) | 1.564 | | b, c |
| Poly(1-phenylcyclohexyl methacrylate) | 1.5645 | | |
| Poly(methyl α-bromoacrylate) | 1.5672 | | |
| Poly(benzyl methacrylate) | 1.5680 | | |
| Poly(2-phenylsulfonyl)ethyl methacrylate) | 1.5682 | | |
| Poly(m-cresyl methacrylate) | 1.5683 | | |
| Poly(o-methoxyphenyl methacrylate) | 1.5705 | | |
| Poly(phenyl methacrylate) | 1.5706 | 407 | |
| Poly(o-cresyl methacrylate) | 1.5707 | | |
| Poly(diallyl phthalate) | 1.572 | | b |
| Poly(2,3-dibromopropyl methacrylate) | 1.5739 | | |
| Poly(vinyl benzoate) | 1.5775 | | |
| Poly(1,2-diphenylethyl methacrylate) | 1.5816 | | |
| Poly(o-chlorobenzyl methacrylate) | 1.5823 | | |
| Poly(m-nitrobenzyl methacrylate) | 1.5845 | | |
| Poly(N-(2-phenylethyl)methacrylamide) | 1.5857 | | |
| Poly(4-methoxy-2-methylstyrene) | 1.5868 | | |
| Poly(o-methylstyrene) | 1.5874 | | |
| Poly(styrene) | 1.59–1.592 | | |
| Poly(o-methoxystyrene) | 1.5964 | 348 | |
| Poly(diphenylmethyl methacrylate) | 1.5933 | | |
| Poly(p-bromophenyl methacrylate) | 1.5964 | | |
| Poly(N-benzyl methacrylamide) | 1.5965 | | |
| Poly(p-methoxystyrene) | 1.5967 | | |
| Poly(o-chlorodiphenylmethyl methacrylate) | 1.6040 | | |
| Poly(pentachlorophenyl methacrylate) | 1.608 | | |
| Poly(0-chlorostyrene) | 1.6098 | | |
| Poly(phenyl α-bromoacrylate) | 1.612 | | |
| Poly(p-divinylbenzene) | 1.6150 | | b |
| Poly(N-vinylphthalimide) | 1.6200 | | |
| Poly(2,6-dichlorostyrene) | 1.6248 | 440 | |
| Poly(β-naphthyl methacrylate) | 1.6298 | | |
| Poly(α-naphthyl carbinyl methacrylate | 1.63 | | |
| Poly(2-vinylthiophene) | 1.6376 | | |

TABLE 8-continued

HomoPolymer System Properties

| Polymer | Refractive Index (n) | Glass Transition Temperature (Tg) (° K) | Comments |
|---|---|---|---|
| Poly(∝-naphthyl methacrylate) | 1.6410 | | |
| Poly(vinyl phenyl sulfide) | 1.6568 | | |
| Poly(vinylnaphthalene) | 1.6818 | | |
| Poly(vinylcarbazole) | 1.683 | | |
| Poly(pentabromophenyl-methacrylate) | 1.71 | | | a polar
b crosslinking
c adhesion
Comments a, b and c are based on the individual monomer properties that form the final homopolymer material
Tg (° C.) = Tg (° K) - 273°

Table 9 shows how different polymer systems and blends interact with conventional EO chromophores and the EO chromophores of the present invention, and influence the refractive index of the total system.

TABLE 9

Thermoplastic Polymer Combinations (Conventional EO Chromophores and EO Chromophores of the Present Invention)

| Smpl. No. | Polymer System | EO Chromophore | Refractive Index (n) | Film Thickness (um) |
|---|---|---|---|---|
| 1 | 50/50 blend of polymethyl-methacrylate and trifluoroethyl-methacrylate/acrylonitrile copolymer (sample 2, Table 7) | None | 1.465 | — |
| 2 | (1 gram sample) (Sample 2, Table 7) | 0.01 gm Disperse Red-1 (conventional EO chromophore) | 1.51 | 0.49 |
| 3 | 1 gram sample (Sample 2, Table 7) | 0.01 gm Disperse Red-1 (conventional EO chromophore) | 1.51 | 1.0 |

TABLE 9-continued

Thermoplastic Polymer Combinations (Conventional EO Chromophores and EO Chromophores of the Present Invention)

| Smpl. No. | Polymer System | EO Chromophore | Refractive Index (n) | Film Thickness (um) |
|---|---|---|---|---|
| 4 | 1 gram sample polymethyl-methacrylate | 0.01 gm Disperse Red-1 (conventional EO chromophore) | 1.51 | 1.24 |
| 5 | 1 gram sample (Sample 6, Table 7) (homopolymer of trifluoroethyl-methacrylate) | Neither Disperse Red-1 nor nitroaniline were soluble in this polymer (conventional EO chromophores) | — | — |
| 6 | 1 gram sample (Sample 6, Table 7) (homopolymer of trifluoroethyl-methacrylate) | 0.01 gm fluorinated meta-nitroaniline EO chromophore of this invention | 1.49 | 0.49 |

The solubility of the conventional EO chromophore was better with a blend of a conventional polymer with the copolymers of this invention, or with copolymers of this invention that contained a nitrile functional group.

Table 10 presents electrooptic coefficient information for the thermoplastic polymer systems of the present invention.

TABLE 10

Electrooptic Coefficient

| System | Film Thickness (um) | Poling Temperature ° C. | Poling Voltage (DC) | EO Coefficient (Pm/v) |
|---|---|---|---|---|
| Disperse Red-1 (conventional EO chromophore) in polymethylmethacrylate (control) | 1.8 | 95 | 120 | 2.6 |
| 3-nitroaniline (conventional EO chromophore) in polymethylmethacrylate (control) | 1.1 | 95 | 110 | Could not be measured (0.1<) |
| 4-fluoro-3-nitroaniline (EO chromophore of this invention) in polymethylacrylate | 1.1 | 95 | 110 | 0.3 |
| Sample 4 (Table 7) with Disperse Red-1 (conventional EO chromophore) | 2.8 | 80 | 150 | 1 |

POLYMER EXAMPLE 4

Novel Thermosetting Polymers

A copolymer was prepared in a similar manner as described for Polymer Examples 2 and 3 but in this embodiment, part of the methylmethacrylate monomer (15%) was replaced with hydroxyethyl acrylate. This copolymer contained approximately (all wt. %):
60% trifluoroethylmethacrylate (monomer of low refractive index n=1.361),
15% methylmethacrylate (monomer of slightly higher refr. index n=1.49),
15% hydroxyethylmethacrylate (crosslinker),
8% acrylonitrile (compatibility with chromophore),
1% methacryloxypropyl-trimethoxy silane (adhesion promoter), and
1% acrylic acid (adhesion promoter).

This polymer system was combined with a conventional EO chromophore (metanitroaniline) and a thermally activated condensation/transetherification crosslinking agent such as hexamethoxymelamine and dissolved in dioxane (1–5% solids). This solution was spun onto ITO coated quartz or glass slides and baked in an oven at 80° C. for 1 hr to effect the crosslinking reaction. This cured or crosslinked film had excellent solvent resistance while still maintaining a high degree of electrooptical activity. In contrast, all of the thermoplastic polymers of the prior art and this invention could be redissolved with solvent after applying to a substrate.

The system could also be combined with an EO chromophore of this invention with similar results.

POLYMER EXAMPLE 5

Direct Formation of Novel Thermosetting Polymers

In this example, a novel approach was used to create three polymer systems that were highly suitable for fabrication of optical switch devices. In this examples, the following basic ingredients were used:
trifluroethylmethacrylate (50%) (monomer for low refractive index),
ethyleneglycoldiacrylate (30%) (to cross-link and increase $T_g$),
acrylonitrile (5%) (compatibility with chromophore), and
acrylic acid (1%) (adhesion promotion).

In a first and second reaction, the conventional EO chromophores (Disperse Red-1 or methacrylic acid ester of Disperse Red-1) were mixed with and reacted with the basic ingredients. In a third reaction, a fluorinated EO chromophore of this invention was combined to create a 100% reactive liquid system. To this liquid reactive system was added a free radical initiator (benzoyl peroxide–2% by weight) and the catalyzed liquid system applied to a quartz waveguide, covered with a thin piece of weighted Teflon film and heated in oven for 8 hours until fully cured into a rigid solid highly crosslinked film having excellent adhesion to the silica substrate. See Table 11 below.

TABLE 11

Direct Formation of Novel Thermosetting Polymers

| Sample No. | Ingredients (wt %) | EO chromophore | Free radical initiator |
|---|---|---|---|
| 1 | trifluroethylmethacrylate (50%) ethyleneglycoldiacrylate (30%) acrylonitrile (5%) acrylic acid (1%) | Disperse Red-1 | benzoyl peroxide |
| 2 | trifluroethylmethacrylate (50%) ethyleneglycoldiacrylate (30%) acrylonitrile (5%) acrylic acid (1%) | methacrylic acid ester of Disperse Red-1 | benzoyl peroxide |
| 3 | trifluroethylmethacrylate (50%) ethyleneglycoldiacrylate (30%) acrylonitrile (5%) acrylic acid (1%) | 4-fluoro-3-nitroanaline | benzoyl peroxide |

POLYMER EXAMPLE 6

Other Fluorine Containing or Low Refractive Index Polymer Systems

In alternative embodiments, the present invention is practiced using different monomer building blocks (see Table 12 below) to create new polymer systems other than those constructed using unsaturated monomer materials (Tables 2, 3, and 4).

TABLE 12

Polyester, Polyamide, Polyurethane, Polyimide and Epoxy Monomers

| Monomers | Refractive Index |
|---|---|
| Alkanediols and Fluorinated Alkanediols | 1.43–1.46 |
| Etherdiols and Fluorinated polyetherdiols | 1.44–1.46 |
| Anhydrides | 1.324–1.51 |
| Dianhydrides | — |
| Diacids | — |
| Diamines | 1.45 |
| Epoxides | 1.36–1.55 |
| Diisocyanates | 1.45–1.59 |
| Lactams and Lactones | 1.41–1.48 |

POLYMER EXAMPLE 6A

In this example, a fluorine containing polyester resin was prepared by combining one mole of tetrafluorosuccinic anhydride (n=1.320) and one mole of 2,2,3,3,4,4 hexafluoro 1,5-pentanediol or one mole of tetrafluorophthalic anhydride and ethylene glycol as shown below:

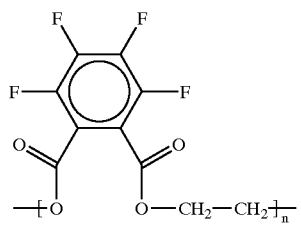

POLYMER EXAMPLE 6B

In this example, fluorine containing polyamides were produced by reacting one mole of a diamine (1,6 hexane diamine) with one mole of a perfluoropolyether diacid fluoride as shown below:

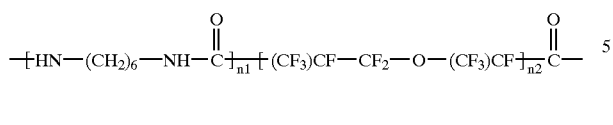

POLYMER EXAMPLE 6C

In this example, reactive epoxy resin systems were prepared by reacting equal parts of a fluorinated epoxy resin with a perfluorinated dianhydride as shown below:

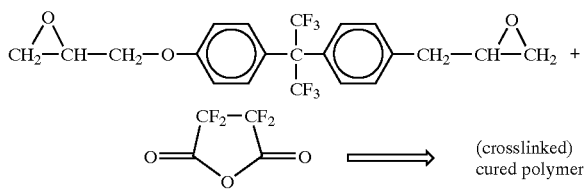

(crosslinked) cured polymer

POLYMER EXAMPLE 6D

For this example, fluorinated polyurethane polymers (thermoplastic or thermosetting) were produced in a similar manner as shown in the following reaction sequence.

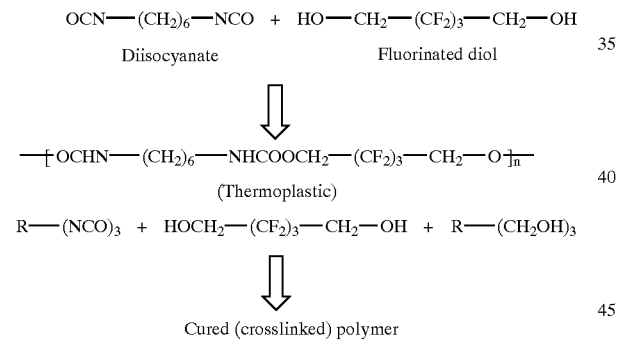

POLYMER EXAMPLE 6E

In this example, fluorinated polyimides can be produced by the following reaction sequence.

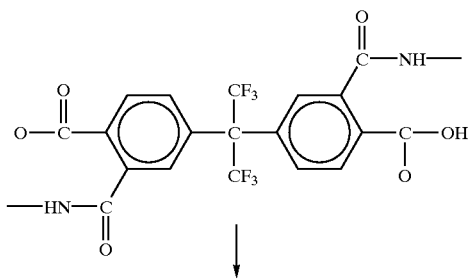

-continued

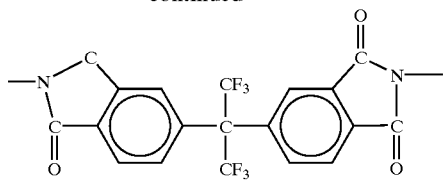

Polyimide

All of these previously described fluorine containing low refractive index polymer systems (polyesters, polyamides, polyimides, epoxy polymers, polyurethanes) can be further modified to contain adhesion promotion functionality (—CN, —COOH, —Si(OMe)$_3$) and chemically combined EO chromophores.

POLYMER EXAMPLE 6F

This example illustrates modified polyesters of the present invention that can be prepared according to the following reaction sequence:

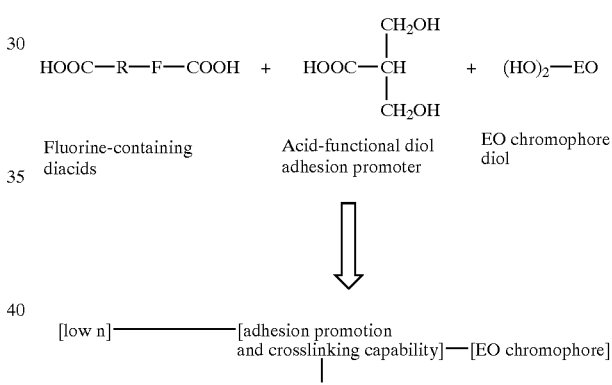

POLYMER EXAMPLE 6G

Hybrid (Organic-Inorganic) or Nanocomposite Polyester Polymers

A hybrid polyester polymer was prepared according to the processes described by Rob Van Der Linde and Suzan Frings which was presented at the 6th Biennial North American Research Conference on "The Science and Technology of Organic Coatings" Nov. 5–8, 2000 at the Westin Resort Hotel, Hilton Head Island, S.C. (proceedings published by the Institute of Materials Science—New Paltz—New York).

A hydroxy-terminated polyester was reacted with 3-(triethoxysilyl) propyl isocyanate followed by further reaction with tetraethoxy silane and hexamethoxy melamine. The final result was a highly transparent coating with good optical properties that can be used in optical devices.

POLYMER EXAMPLE 6H

Dendritic Polyester and Polyethers

Highly branched or dendritic polyesters can be made by the reaction of trimellitic anhydride with propylene oxide and the dendritic polyethers can be prepared using benzyl halide derivatives or dihydroxy benzene (complete synthetic procedures and descriptions of functional dendrimers, hyperbranched and star polymers can be found in *Progress in Polymer Science, an International Review* Journal May 2000, Vol 25, No. 4, K. Inoue pages 453–571).

POLYMER EXAMPLE 6I

Modified Polyurethane

Modified polyurethanes according to the invention can be prepared by the following reaction of low refractive index (preferably n=1.43–1.46) fluorine containing diols, a polyisocyanate, an EO chromophore diol, and an adhesion promoter.

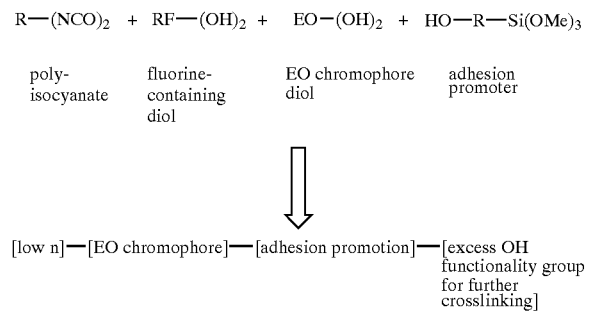

POLYMER EXAMPLE 6J

Polyphosphazenes

According to the present invention, the preparation of polyphosphazenes systems is described in general terms as follows:

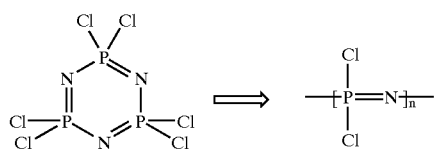

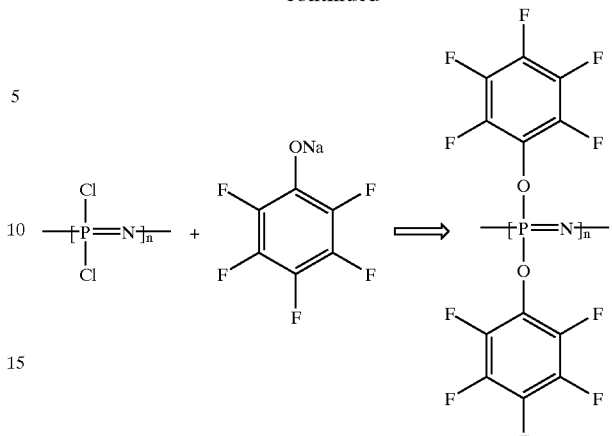

Low refractive index thermoplastic polymers

These polymers can be easily modified to be thermosetting, contain adhesive bonding capabilities as well as contain a covalently bonded EO chromophore. The following structure represents the general structure of a preferred polymer according to the present invention:

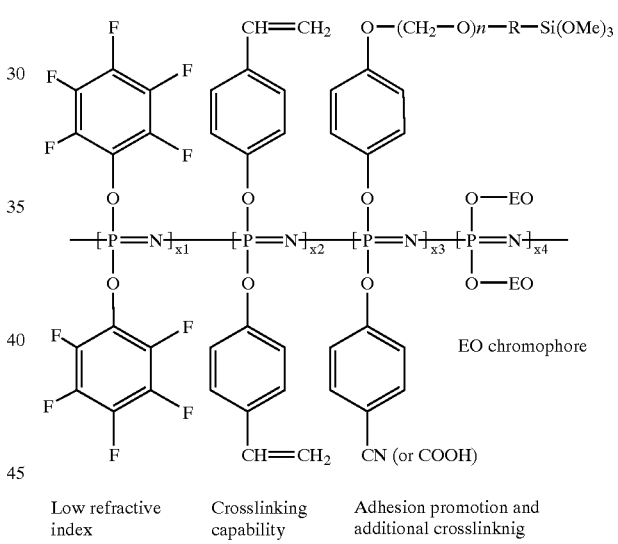

| Low refractive index | Crosslinking capability | Adhesion promotion and additional crosslinknig |

EO chromophore wherein $x_1$=50–80%, $x_2$=10–15%, $x_3$=1–5%, $x_4$=5–20% and wherein said percentages are by wt %. Further, any one or more of the —F groups can be replaced by an —H group. Typically in a preferable embodiment of the invention, there is at least one —F atom present. Preferably there are sufficient —F atoms present to obtain the desired refractive index and compatibilization with EO chromophores.

POLYMER EXAMPLE 7

Polymer for Nonsilica Substrates Such as Glass and Plastics

The previously described polymer systems are designed to have relatively low refractive index values but it is possible to design other polymer systems with higher refractive index values but with the same critical requirements as described earlier. The desired profiles of these new polymers are shown in Table 13.

TABLE 13

Comparison of the Prior Art High Refractive Index Polymers and the High Refractive Index Polymers of this Invention

| | Refractive Index | Tg | Thermal Stability {cross-linking capability} | Water/Moisture Sensitivity | Ease of Poling | Adhesion | EO Chromophore Compatibility |
|---|---|---|---|---|---|---|---|
| Prior Art | n > 1.5 | 100° C.> | Variable {Variable} | Yes | No | Poor | Highly variable |
| This Example | n > 1.5 | 100° C.> | Yes {Yes} | No | Yes | Excellent | Excellent |

A copolymer for this invention was prepared by free radical (benzoyl peroxide or Azo-bisbutylnitrile) polymerization of (all wt. %):

80% styrene monomer (base monomer),
13% methylmethacrylate (base comonomer),
5% acrylonitrile (EO compatibility), and
2% methacryloxypropylsilane(trimethoxy) (adhesion promoter), in toluene solution (20% solids). The resultant polymer had a Tg of around 100° C. and excellent adhesion to glass or polystyrene and polycarbonate substrates. A control polymer that only contained styrene and methylmethacrylate did not have good adhesion to glass or plastic substrates. These particular polymers can be used with conventional EO chromophores, as well as the EO chromophores of this invention.

POLYMER EXAMPLE 8

Improved Flow

It has been discovered that small amounts of aromatic functional groups in or attached to the polymer backbone help in causing the polymer in a solvent to wet and flow evenly to produce excellent thin film properties. For example, a 100% acrylic polymer (polymethylmethacrylate) dissolved in dioxane (20% solution) was spin coated onto glass slides and produced films that had a wide variety of ridges and structures. A copolymer of methylmethacrylate and 1% styrene (flow agent) resulted in a very thin film when spin cast out of dioxane but these films had very little ridges or striations.

Similar results were observed for low refractive index polymer systems that contained small amounts of styrene or perfluorinated styrene monomers copolymerized with low refractive index acrylic monomer materials. The addition of aromatics such as styrene or perfluorinated styrene (for the low refractive index system) provides the desired improved flow properties.

POLYMER EXAMPLE 9

Poling Efficiency

Polymers such as polymethylmethacrylate that contain EO chromophore (Disperse Red-1) generally require approximately 100 volts per micron of film thickness to align or pole the EO chromophore. Other factors such as Tg, temperature and polymer molecular weight also influence the poling efficiency of a polymer and EO system.

It has been found that polymers containing —CF$_3$, —CN, and

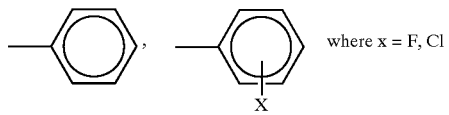

functional groups in the range of 1 to 50% in or on their backbone structures can be used in lowering the poling voltage to below 100 volts per micron film thickness.

Regarding thermoplastic and thermosetting polymers, the following conclusions are apparent from the present invention:

(a) low refractive index fluoropolymers are not alone sufficient to create a durable host material for a guest or chemically bonded optically active chromophore (prior art);

(b) combinations of fluorine containing monomers with non-fluorine containing monomers allows one to maintain an acceptable refractive index value and high Tg values for silica based optical waveguide systems (this invention);

(c) the use of optically active chromophore compatibilization groups (solubilization groups) provides materials with superior properties (1) for conventional chromophores, defined elsewhere herein, typical examples are nitrites (typical example, acrylonitrile), and esters, in some embodiments aromatics may be included; (2) for chromophores according to the present invention, defined elsewhere herein, typical examples include nitrites (typical example, acrylonitrile), fluorinated esters, and fluorinated aromatics;

(d) the use of adhesive promotion functional groups (typical examples include nitriles, silanes, fluorinated silanes, organic acids (e.g. carboxylic acids), fluorinated acids, alcohols, and fluorinated alcohols, in some embodiments amides, amines, may be included) increase the overall durability of the entire polymer system in a device (this invention);

(e) polymer electrical property control functional groups (typical examples are nitrites, aromatics) can be added to enhance electrical properties;

(f) water resistant functional groups (typical examples are styrenes, cycloaliphatics) all increase the overall durability of the entire polymer system in a device (this invention); and (g) the polymers (copolymers and blends of homopolymers with other homopolymers or copolymers) described in this invention can be used to create enhanced total systems (superior to the prior art) using conventional high hydrocarbon content optically active chromophores.

Typically, and preferably the functional optical material contains between about 0.1 to about 20% of one or more compatibilizers as described above. Typically, the functional optical material contains between about 0.1 to about 10% of an adhesive promotion group, or combination of adhesive promotion groups as described above.

When a particular compatibilizer can also perform some other function (e.g. as an adhesion promoter) the best overall properties are obtained when a different material is added that performs the other function, thus if a nitrile is used as a compatibilizer for chromophores, then another material such as a silane or fluorinated silane should be used for adhesion enhancement. While one alone would perform both functions, both materials together appear to perform synergistically to provide greatly enhanced performance over either alone.

The polymers of this invention are even more superior when the fluorinated optically active chromophores according to this invention are used. In addition, the polymers of the present invention, as illustrated with the material from Sample 4 (Table 7) above, work with nonfluorinated materials as well.

II. Electrooptical Chromophores

The initial materials used in preparation of EO molecules of this invention were purchased from Aldrich Chemical Company P.O. Box 2060 Milwaukee, Wis., 53201. For methods preferred in the preparation of the electrooptical materials of this invention, see generally, Roy T. Holm, *Journal of Paint Technology*, Vol 39, No 509, June 1967 pages 385–388, and J. March, *Advanced Organic Chemistry Reaction Mechanisms and Structures* McGraw Hill Book Co. New York 1968.

The following reactions are representative of the general chemistry of the preferred electrooptical materials of this invention.

First Representative Reaction

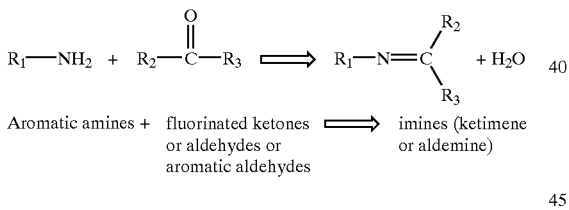

Aromatic amines + fluorinated ketones ⟹ imines (ketimene or aldehydes or aromatic aldehydes or aldemine)

Second Representative Reaction

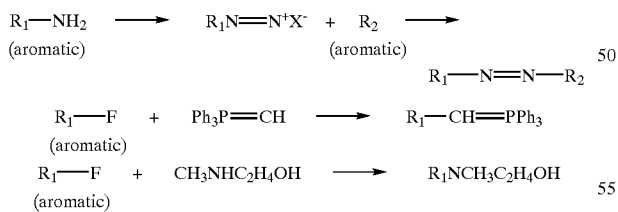

Third Representative Reaction

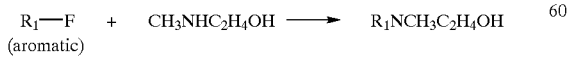

Typical electrooptic (EO) chromophores useful with the present invention are substituted anilines, substituted azobenzenes, substituted stilbenes, or substituted imines as illustrated by the general structures shown below:

A. Substituted Anilines

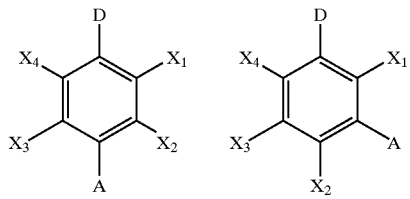

Conventional Substituted Aniline EO Chromophores
  Wherein D=donor=—$NH_2$, —$N(CH_3)_2$, —$N(CH_2CH_3)_2$, or —$N(Y)_2$ where Y=alkyl alcohols, alkyl (hydrocarbon fluorocarbon) esters, or alkyl silane derivatives;
  A=acceptor=—$NO_2$, or —$C(CN)C(CN)_2$,
and
wherein $X_1$, $X_2$, $X_3$, $X_4$ are each —H.

Substituted Aniline EO Chromophores According to This Invention
  Wherein D=donor=—$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;
  A=acceptor= —$NO_2$, —$C(CN)C(CN)_2$, or —$N=C(R_1)(R_2)$, wherein $R_1=CF_3$, $C_2F_5$, $C_nF_{2+1}$, $R_2$=H, $CH_3$, $CF_3$, $C_2F_5$
  wherein when A= = —$NO_2$, or —$C(CN)C(CN)_2$, then $X_1$, $X_2$, $X_3$, $X_4$ are each independently selected from the group —F and —H, and at least one —F is selected, and when A= —$N=C(R_1)(R_2)$, wherein $R_1=CF_3$, $C_2F_5$, $C_nF_{2n+1}$, $R_2$=H, $CH_3$, $CF_3$, $C_2F_5$, then $X_1$, $X_2$, $X_3$, $X_4$ are each independently selected from the group —F and —H.

Additional Substituted Aniline EO Chromophores According to This Invention

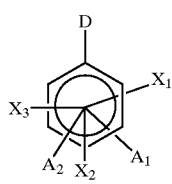

Wherein D=donor= —$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;
primary acceptor=—$NO_2$, —$C(CN)C(CN)_2$, or —$N=C(R_1)(R_2)$, where $R_1=CF_3$, $C_2F_5$, $C_nF_{2n+1}R_2$=H, $CH_3$, $CF_3$, $C_2F_5$
secondary acceptor=—CN, or —$CF_3$
wherein when $A_1$ and $A_2$ are both primary acceptors selected from —$NO_2$, or —$C(CN)C(CN)_2$, then $X_1$, $X_2$, $X_3$ are each independently selected from —F and —H, but at least one —F must be selected;
wherein when $A_1$ and $A_2$ are both secondary acceptors selected from —$NO_2$, or —$C(CN)C(CN)_2$, then $X_1$, $X_2$, $X_3$ are each independently selected from —F and —H, but at least one —F must be selected;
wherein when $A_1$ and/or $A_2$ are selected from the primary acceptor —$N=C(R_1)(R_2)$, where $R_1=CF_3$, $C_2F_5$, $C_nF_{2n+1}$, $R_2$=H, $CH_3$, $CF_3$, $C_2F_5$, then $X_1$, $X_2$, $X_3$ are each independently selected from —F and —H; and wherein when $A_1$ is selected from any primary acceptor, and $A_2$ is selected from any secondary acceptor, then $X_1$, $X_2$, $X_3$ are each independently selected from —F and —H.

B. Substituted Azobenzenes

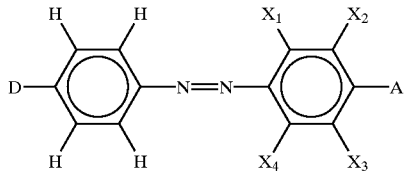

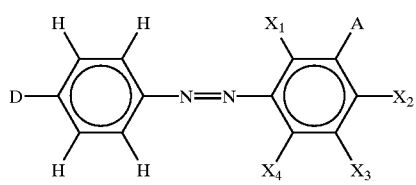

Conventional Substituted Imine EO Chromophores

Wherein D=donor=—$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;

A=acceptor= —$NO_2$, or —$C(CN)C(CN)_2$, and wherein $X_1$, $X_2$, $X_3$, $X_4$ are each —H.

Wherein D=donor=—$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;

A=acceptor=—$NO_2$, —$C(CN)C(CN)_2$, or —N=C($R_1$)($R_2$), wherein $R_1$=$CF_3$, $C_2F_5$, $C_nF_{2n+1}$, $R_2$=H, $CH_3$, $CF_3$, $C_2F_5$ wherein when A==—$NO_2$, or —$C(CN)C(CN)_2$, then $X_1$, $X_2$, $X_3$, $X_4$ are each independently selected from the group —F and —H, and at least one —F is selected, and when A=—N=C($R_1$)($R_2$), wherein $R_1$=$CF_3$, $C_2F_5$, $CF_{2n+1}$, $R_2$=H, $CH_3$, $CF_3$, $C_2F_5$, then $X_1$, $X_2$, $X_3$, $X_4$ are each independently selected from the group —F and —H.

Additional Substituted Azobenzene EO Chromophores According to This Invention

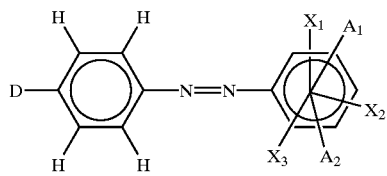

Wherein D=donor=—$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;

primary acceptor=—$NO_2$, —$C(CN)C(CN)_2$, or —N=C($R_1$)($R_2$), where $R_1$=$CF_3$, $C_2F_5$, $C_nF_{2n+1}$, $R_2$=H, $CH_3$, $CF_3$, $C_2F_5$ secondary acceptor=—CN, or —$CF_3$ wherein when $A_1$ and $A_2$ are both primary acceptors selected from —$NO_2$, or —$C(CN)C(CN)_2$, then $X_1$, $X_2$, $X_3$ are each independently selected from —F and —H, but at least one —F must be selected;

wherein when $A_1$ and $A_2$ are both secondary acceptors selected from —$NO_2$, or —$C(CN)C(CN)_2$, then $X_1$, $X_2$, $X_3$ are each independently selected from —F and —H, but at least one —F must be selected;

wherein when $A_1$ and/or $A_2$ are selected from the primary acceptor —N=C($R_1$)($R_2$), where $R_1$=$CF_3$, $C_2F_5$, $C_nF_{2n+1}$, $R_2$=H, $CH_3$, $CF_3$, $C_2F_5$, then $X_1$, $X_2$, $X_3$ are each independently selected from —F and —H; and wherein when $A_1$ is selected from any primary acceptor, and $A_2$ is selected from any secondary acceptor, then $X_1$, $X_2$, $X_3$ are each independently selected from —F and —H.

C. Substituted Stilbenes

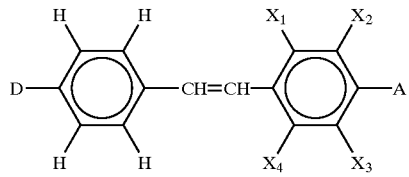

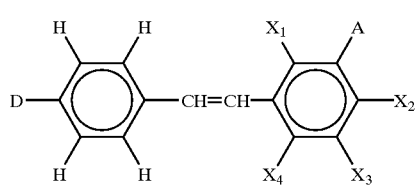

Conventional Substituted Stilbene EO Chromophores

Wherein D=donor=—$NH_2$, —$N(CH_3)_2$, —$N(CH_2CH_3)_2$, or —$N(Y)_2$ where Y=alkyl alcohols, alkyl (hydrocarbon fluorocarbon) esters, or alkyl silane derivatives;

A=acceptor=—$NO_2$, or —$C(CN)C(CN)_2$, and wherein $X_1$, $X_2$, $X_3$, $X_4$ are each —H.

Substituted Stilbene EO Chromophores According to This Invention

Wherein D=donor=—$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;

A=acceptor=—$NO_2$, —$C(CN)C(CN)_2$, or —N=C($R_1$)($R_2$), wherein $R_1$=$CF_3$, $C_2F_5$, $C_nF_{2n+1}$, $R_2$=H, $CH_3$, $CF_3$, $C_2F_5$ wherein when A== —$NO_2$, or —$C(CN)C(CN)_2$, then $X_1$, $X_2$, $X_3$, $X_4$ are each independently selected from the group —F and —H, and at least one —F is selected, and when A=—N=C($R_1$)($R_2$), wherein $R_1$=$CF_3$, $C_2F_5$, $C_nF_{2n+1}$, $R_2$=H, $CH_3$, $CF_3$, $C_2F_5$, then $X_1$, $X_2$, $X_3$, $X_4$ are each independently selected from the group —F and —H.

Additional Substituted Stilbene EO Chromophores According to This Invention

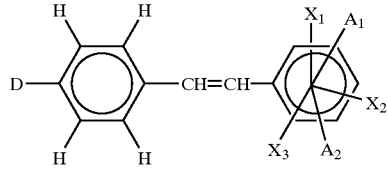

Wherein D=donor=—$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;

primary acceptor=—$NO_2$, —$C(CN)C(CN)_2$, or —$N=C(R_1)(R_2)$, where $R_1=CF_3$, $C_2F_5$, $C_nF_2$, $R_2=H$, $CH_3$, $CF_3$, $C_2F_5$ secondary acceptor=—CN, or —$CF_3$ wherein when $A_1$ and $A_2$ are both primary acceptors selected from —$NO_2$, or —$C(CN)C(CN)_2$, then $X_1$, $X_2$, $X_3$ are each independently selected from —F and —H, but at least one —F must be selected;

wherein when $A_1$ and $A_2$ are both secondary acceptors selected from —$NO_2$, or —$C(CN)C(CN)_2$, then $X_1$, $X_2$, $X_3$ are each independently selected from —F and —H, but at least one —F must be selected;

wherein when $A_1$ and/or $A_2$ are selected from the primary acceptor —$N=C(R_1)(R_2)$, where $R_1=CF_3$, $C_2F_5$, $C_nF_{2n+1}$, $R_2=H$, $CH_3$, $CF_3$, $C_2F_5$, then $X_1$, $X_2$, $X_3$ are each independently selected from —F and —H; and wherein when $A_1$ is selected from any primary acceptor, and $A_2$ is selected from any secondary acceptor, then $X_1$, $X_2$, $X_3$ are each independently selected from —F and —H.

D. Substituted Imines

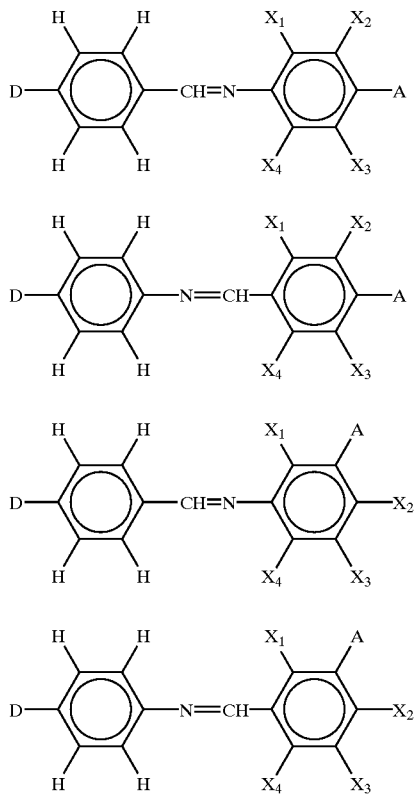

Conventional Substituted Azobenzene EO Chromophores
Wherein D=donor= —$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;
A=acceptor= —$NO_2$, or —$C(CN)C(CN)_2$, and
wherein $X_1, X_2, X_3, X_4$ are each —H.
Substituted Imine EO Chromophores According to This Invention
Wherein D=donor= —$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;

A=acceptor= —$NO_2$, —$C(CN)C(CN)_2$, or —$N=C(R_1)(R_2)$, wherein $R_1=CF_3$, $C_2F_5$, $C_nF_{2n+1}$, $R_2=H$, $CH_3$, $CF_3$, $C_2F_5$ wherein when A= =—$NO_2$, or —$C(CN)C(CN)_2$, then $X_1$, $X_2$, $X_3$, $X_4$ are each independently selected from the group —F and —H, and at least one —F is selected, and when A= —$N=C(R_1)(R_2)$, wherein $R_1=CF_3$, $C_2F_5$, or $C_nF_{2n+1}$, $R_2=H$, $CH_3$, $CF_3$, $C_2F_5$, then $X_1$, $X_2$, $X_3$, $X_4$ are each independently selected from the group —F and —H.

Additional Substituted Imine EO Chromophores According to This Invention

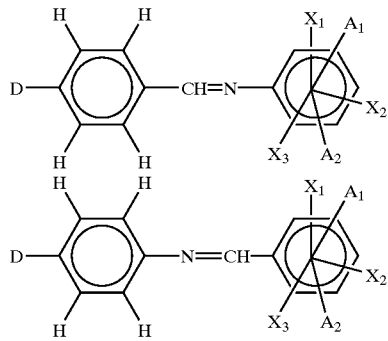

Wherein D=donor=—$NH_2$, —$N(CH_3)_2$, —$N(CH_2CH_3)_2$, or —$N(Y)_2$ where Y=alkyl alcohols, alkyl (hydrocarbon or fluorocarbon) esters, or alkyl silane derivatives;

primary acceptor=—$NO_2$, —$C(CN)C(CN)_2$, or —$N=C(R_1)(R_2)$, where $R_1=CF_3$, $C_2F_5$, $C_nF_{2n+1}$, $R_2=H$, $CH_3$, $CF_3$, $C_2F_5$ secondary acceptor=—CN, or —$CF_3$ wherein when $A_1$ and $A_2$ are both primary acceptors selected from —$NO_2$, or —$C(CN)C(CN)_2$, then $X_1$, $X_2$, $X_3$ are each independently selected from —F and —H, but at least one —F must be selected;

wherein when $A_1$ and $A_2$ are both secondary acceptors selected from —$NO_2$, or —$C(CN)C(CN)_2$, then $X_1$, $X_2$, $X_3$ are each independently selected from —F and —H, but at least one —F must be selected;

wherein when $A_1$ and/or $A_2$ are selected from the primary acceptor —$N=C(R_1)(R_2)$, where $R_1=CF_3$, $C_2F_5$, $C_nF_{2n+1}$, $R_2=H$, $CH_3$, $CF_3$, $C_2F_5$, then $X_1$, $X_2$, $X_3$ are each independently selected from —F and —H; and wherein when $A_1$ is selected from any primary acceptor, and $A_2$ is selected from any secondary acceptor, then $X_1$, $X_2$, $X_3$ are each independently selected from —F and —H.

EO Chromophore Example 1

Substituted Anilines

The following chemical structures in Table 14 are a comparison of the conventional to the electrooptical materials of the present invention and further aid in illustrating the invention. These EO materials are substituted anilines and are simplified versions of the general formulas illustrated above.

TABLE 14

Comparison of the Conventional and the Present Invention Electrooptic Materials

| Structure 1 | Structure 2 | Type |
|---|---|---|
| H$_2$N—[benzene]—primary | H$_2$N—[benzene]—secondary | Conventional |
| H$_2$N—[benzene(F)]—primary | H$_2$N—[benzene(F)]—secondary | This invention |
| H$_2$N—[benzene(primary)]—primary | H$_2$N—[benzene(secondary)]—secondary | Conventional |
| H$_2$N—[benzene(F, primary)]—primary | H$_2$N—[benzene(F, secondary)]—secondary | This invention |
| H$_2$N—[benzene(secondary)]—primary | H$_2$N—[benzene(F, secondary)]—primary | This invention |

Note:
Primary = —NO$_2$, —C(CN)C(CN)$_2$, —N═C(R1)(R$_2$2), where R$_1$ = CF$_3$, C$_2$F$_5$, C$_n$F$_{2n+1}$,
R$_2$ = H, CH$_3$, CF$_3$, C$_2$F$_5$
Secondary = —CN, —CF$_3$ Table 14 shows the presence and location of primary and secondary electron withdrawing groups as well as fluorine atoms for substituted anilines. This embodiment of the invention has two typical types of EO chromophores as illustrated by the chemical structures. A first type of EO chromophore of the invention includes a substituted aniline having at least one primary or at least one secondary electron withdrawing group, and at least one fluorine group on the aromatic ring. A second type of EO chromophore of the invention includes a substituted aniline having at least one primary and at least one secondary electron withdrawing group on the aromatic ring. A third type of EO chromophore of the invention includes a substituted aniline having at least one primary and at least one secondary electron withdrawing group on the aromatic ring, and at least one fluorine atom on the on the aromatic ring. The primary electron withdrawing groups are typically selected from the group consisting of —NO$_2$ and —C(CN)C(CN)$_2$. The secondary electron withdrawing groups are typically selected from the group consisting of —CN, and —CF$_3$. These and other groups are illustrated in more detail elsewhere herein. The location of the electron withdrawing groups and the fluorine atoms may be in any position of the aromatic ring; however, sites for obtaining or maintaining selected properties are determined by procedures described in more detail below.

EO Chromophore Example 2

Substituted Stilbenes, Imines, and Azobenzenes

The following chemical structures in Table 15 are a comparison of the conventional to the electrooptical materials of the present invention. These EO materials are substituted stilbenes, substituted imines, and substituted azobenzenes.

TABLE 15

Comparison of the Conventional and the Present Invention Electrooptic Materials

| Structure | Type |
|---|---|
| H$_2$N—[benzene]—S—[benzene]—primary | Conventional |
| H$_2$N—[benzene]—S—[benzene]—secondary | Conventional |
| H$_2$N—[benzene]—S—[benzene(F)]—primary | This invention |
| H$_2$N—[benzene]—S—[benzene(F)]—secondary | This invention |

TABLE 15-continued

Comparison of the Conventional and the Present Invention Electrooptic Materials

| Structure | Substitution | Type |
|---|---|---|
| H₂N—⟨⟩—S—⟨⟩ | primary / primary | Conventional |
| H₂N—⟨⟩—S—⟨⟩ | secondary / secondary | Conventional |
| H₂N—⟨⟩—S—⟨⟩(F) | primary / primary | This invention |
| H₂N—⟨⟩—S—⟨⟩(F) | secondary / secondary | This invention |
| H₂N—⟨⟩—S—⟨⟩ | secondary / primary | This invention |
| H₂N—⟨⟩—S—⟨⟩(F) | secondary / primary | This invention |

Note:
S = spacer = —CH=CH—, —N=CH—, —CH=N—, —N=N—
             (stilbene)   (imine)    (imine)    (azo)
Primary = —NO₂, —C(CN)C(CN)₂, —N=C(R₁)(R₂),
where R₁ = CF₃, C₂F₅, C$_n$F$_{2n+1}$, R₂ = H, CH₃, CF₃, C₂F₅
Secondary = —CN, —CF₃

EO Chromophore Example 3

Substituted Anilines, Stilbenes, Imines, and Azobenzenes

The fundamental structures for conventional optically active chromophores and optically active chromophores of the present invention have been given in detail herein. In EO chromophores of the present invention, fluorine atoms are typically strategically placed on the aromatic ring so that the EO coefficient, which is directly related to $\mu\beta$ (vector product of the dipole moment times the first hyperpolarizability of the molecule), is increased or is not substantially reduced. The dipole moments and first hyperpolarizabilities were calculated using ab initio electronic structure methods as implemented in JAGUAR™ (Jaguar 4.0, Schrodinger Inc., Portland, Oreg., 1991–2000). Ab initio methods have been shown to provide accurate descriptions of the hyperpolarizabilities in aromatic molecules. Direct comparison of experimental and calculated $\mu\beta$ values for a trial set of 54 organic molecules has shown this method to accurately determine the $\mu\beta$ product for organic molecules of the general type considered in this invention. The tensor components of the first hyperpolarizability were determined by the coupled-perturbed Hartree—Fock method implemented in JAGUAR™. Only the vector product of the hyperpolarizability with the intrinsic dipole ($\mu\beta$) is reported and noted in the tables, as this is the quantity of direct relevance to the EO coefficient of a chromophore. A description of how this critical placement of fluorine atoms influences the $\mu\beta \propto$ EO coefficient is shown in Table 16. All the reported $\mu\beta$ values are in units of $10^{-48}$ esu. The relative rankings for these EO materials are calculated as follows:

Relative Ranking (R)=$\mu\beta$(all —H or —F substituted EO molecule)/$\mu\beta$(all —H EO molecule)

Thus for paranitroaniline (Table 16)

$$R = \frac{54.7}{54.7} = 1.00$$

For 2,6-difluoro-4-nitroaniline $$R = \frac{45.9}{54.7} = 0.84$$

In some cases a fluorine-substituted EO molecule may have a lower $\mu\beta$ coefficient than the all hydrogen EO chromophore. The all hydrogen EO chromophore, however, increases the overall total refractive index of the system (which is undesirable when low refractive indexes are required) as well as introduces a higher level of optical loss (C—H bonds, N—H bonds, O—H bonds) to the total systems than its fluorinated counterpart. Thus, in selecting which EO chromophore structure to use one can trade-off the EO coefficient property of a molecule with its ability to enhance the total properties of the entire system.

Analysis of Fluorine Atom Substitution Effects on Structures Shown in Table 16 for Selected Properties Para (4)—Nitroaniline Two fluorine atoms on the 3,5 positions (46.0) are slightly better than on the 2,6 positions (45.9). Four fluorine atoms on the 2,3,5,6 position are less desirable (45.6) than other combinations.

Meta (3)—Nitroaniline

One fluorine atom on the 6 position (18.7) is better than one fluorine atom on the 2 position (9.84).

Four fluorine atoms on the 2, 4, 5, 6 positions are less desirable (15.9) than substitution at the 6 position.

4-(4-nitrophenylazo)phenylamine

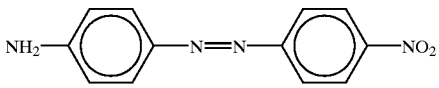

One fluorine atom on the 2 position of the 4-nitrophenylazo group is less desirable (242.1) than a fluorine atom on the 3 position (458.1) of the 4-nitrophenylazo group.

Four fluorine atoms on the 2,3,5,6 position of the 4-nitrophenylazo group is better (350.6) than four fluorine atoms on both the 4-nitrophenylazo group and the phenylamine group (a total of 8 fluorine atoms resulting in a value of 216.0).

4-Nitrophenyl, 4-aminophenyl stilbene

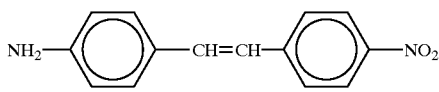

One fluorine atom on the 2 position of the 4-nitrophenyl group is less desirable (325.6) than one fluorine atom on the 3 position of the 4-nitrophenyl group (355.0).

Four fluorine atoms on the 2,3,5,6 position of the 4-nitrophenyl group is more desirable (520.8) than four fluorine atoms both on the 4-nitrophenly group and the phenylamine group (a total of 8 fluorine atoms resulting in a value of 209.1).

Similar results were observed for stilbene having the following structure.

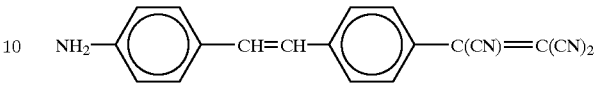

TABLE 16

EO Molecules

| Structure | $\mu\beta$ | Relative Ranking | Comments |
|---|---|---|---|
| H₂N–⌬(H,H/H,H)–NO₂ | 54.7 | 1.00 | Conventional |
| H₂N–⌬(H,F/H,F)–NO₂ | 46.0 | 0.84 | This invention |
| H₂N–⌬(F,H/F,H)–NO₂ | 45.9 | 0.84 | This invention |
| H₂N–⌬(F,F/F,F)–NO₂ | 45.6 | 0.83 | This invention |
| H₂N–⌬(H,NO₂/H,H)–H | 14.3 | 1.00 | Conventional |
| H₂N–⌬(H,NO₂/F,H)–H | 18.7 | 1.31 | This invention |

TABLE 16-continued
EO Molecules
| Structure | μβ | Relative Ranking | Comments |
|---|---|---|---|
| 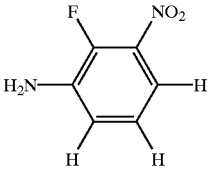 | 9.84 | 0.69 | This invention |
| 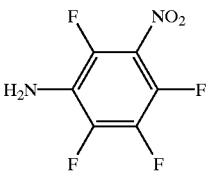 | 15.9 | 1.11 | This invention |
| 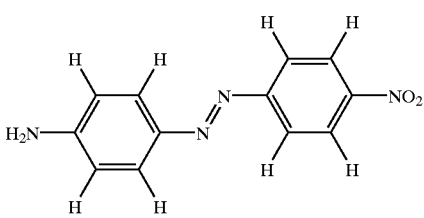 | 287.2 | 1.00 | Conventional |
| 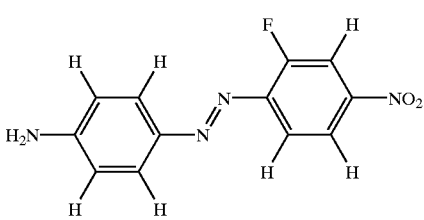 | 242.1 | 0.84 | This invention |
| 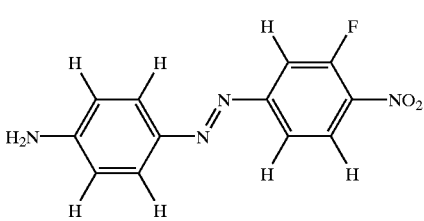 | 458.1 | 1.60 | This invention |
| 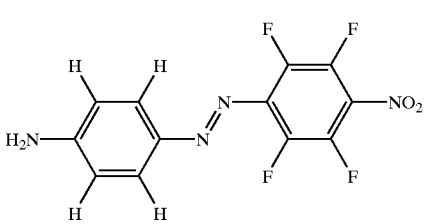 | 350.6 | 1.22 | This invention |
| 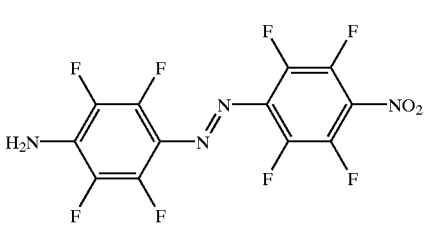 | 216.9 | 0.76 | This invention |

TABLE 16-continued

EO Molecules

| Structure | μβ | Relative Ranking | Comments |
|---|---|---|---|
| H₂N–C₆H₄–CH=CH–C₆H₄–NO₂ | 381.1 | 1.00 | Conventional |
| H₂N–C₆H₄–CH=CH–C₆H₃(F)–NO₂ (F ortho to NO₂, same side) | 325.6 | 0.85 | This invention |
| H₂N–C₆H₄–CH=CH–C₆H₃(F)–NO₂ (F ortho to NO₂, opposite side) | 355.0 | 0.93 | This invention |
| H₂N–C₆H₄–CH=CH–C₆F₄–NO₂ | 520.8 | 1.37 | This invention |
| H₂N–C₆F₄–CH=CH–C₆F₄–NO₂ | 209.1 | 0.55 | This invention |
| H₂N–C₆H₄–CH=CH–C₆H₄–C(CN)=C(CN)₂ | 737.9 | 1.00 | Conventional |

TABLE 16-continued

EO Molecules

| Structure | $\mu\beta$ | Relative Ranking | Comments |
|---|---|---|---|
| (structure) | 666.0 | 0.90 | This invention |
| (structure) | 830.0 | 1.12 | This invention |
| (structure) | 640.1 | 0.87 | This invention |
| (structure) | 356.5 | 0.48 | This invention |

Similar $\mu\beta$ and rankings can be generated for the following EO molecules.

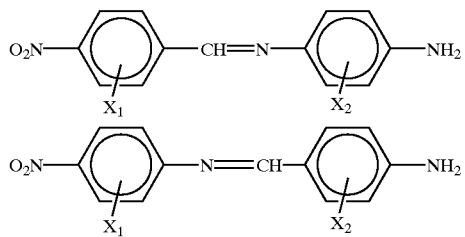

Where $X_1$ and $X_2$ can be independently selected to be an H or F atom.

Critical Parameters for EO Chromophores with Low Index Applications

The critical parameters for an EO molecule are its overall refractive index, number of C—H bonds (optical loss), EO coefficient and spatial or geometric placement of donor/acceptor and other functional groups in its molecular structure. In the present invention, it is demonstrated herein that the EO chromophore for the polymers used in silica optical applications have to be selected to be "compatible" with the low refractive index polymers, contribute to the reduction of the total refractive index of the total system and still maintain a high EO coefficient. Typically, EO chromophores have at least one —F group at an appropriate site or a fluorine containing electron acceptor. Thus, overall EO design is a function of {polymer compatibility; low overall contribution to the total refractive index of the system, high EO efficiency}.

EO Chromophore Example 4

Perfluorinated Alkyl-Imines

A further embodiment of this invention is also based on the following novel structures:

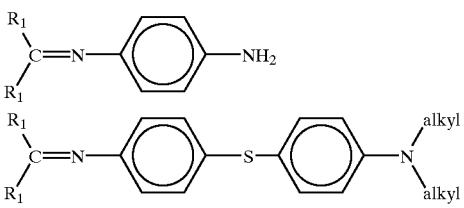

where
$R_1 =$ —$CF_3$, —$C_2F_5$, —$C_nF_{2n+1}$ $R_2$=—H, —$CH_3$,—$CF_3$, —$C_2F_5$
S = —N=N—,   —CH=N—,   —N=CH—, —CH=CH—.

One mole of methylheptafluoropropyl ketone or one mole of perfluoro-2-heptanone

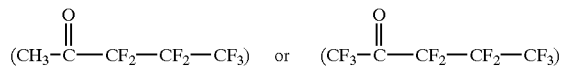

was mixed with excess (1.5 moles) of paraphenylenediamine

in toluene and reacted (thermal stripping of water) to produce the following new classes of EO materials.

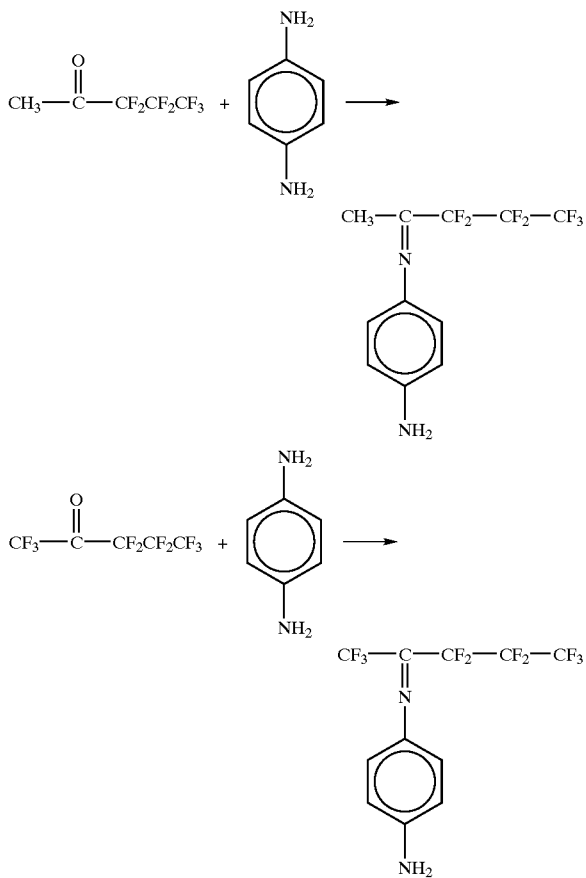

The predicted EO efficiencies ($\mu\beta$) for these two compounds are 18.5 and 60.3. For further details as to production of these compounds, see the J. March reference noted earlier.

EO Chromophore Example 5

Primary and Secondary Electron Withdrawing Groups on EO Chromophores

The present invention is also based on the concept of combining a primary electron withdrawing group (acceptor) with what is defined as a secondary electron withdrawing molecule. The primary electron withdrawing groups (acceptors) are as follows: —$NO_2$

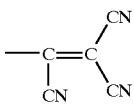

And the secondary electron withdrawing groups are as follows:

—CN —$CF_3$

This embodiment of the invention illustrates the importance of selecting an EO chromophore with the primary and secondary electron withdrawing group in the correct positions in order to maximize the EO effect ($\mu\beta$). The conventional appears to deal with one primary, one secondary, two primary, or two secondary electron withdrawing groups, but not a combination of at least one primary and at least one secondary electron withdrawing groups. Table 17 illustrates the effect of multiple substitutions of primary and secondary electron withdrawing groups on specific sites of an aniline molecule. This embodiment is also illustrated in Tables 14 and 15 for substituted anilines, substituted stilbenes, substituted imines, and substituted azobenzenes.

TABLE 17

EO Molecules of this Invention

| Structure | $\mu\beta$ | Relative Ranking | Comments |
|---|---|---|---|
|  | 54.7 | 1.00 | Conventional |
|  | 27.3 | 0.50 | Conventional |
|  | 57.7 | 1.05 | This invention |
|  | 30.6 | 0.56 | This invention |

TABLE 17-continued

EO Molecules of this Invention

| Structure | $\mu\beta$ | Relative Ranking | Comments |
|---|---|---|---|
| 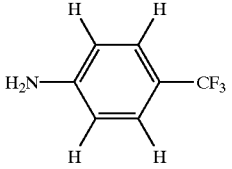 | 10.3 | 0.19 | Conventional |
| 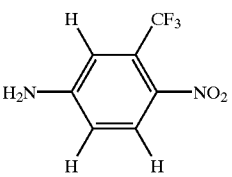 | 51.9 | 0.95 | This invention |
| 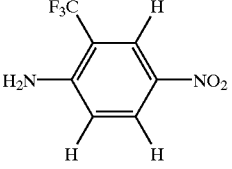 | 38.0 | 0.69 | This invention |
| 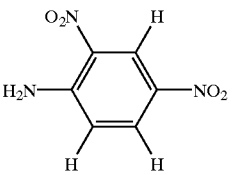 | 29.0 | 0.53 | Conventional |
| 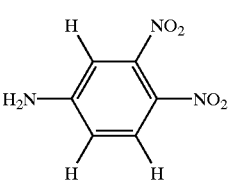 | 37.4 | 0.68 | Conventional |
| 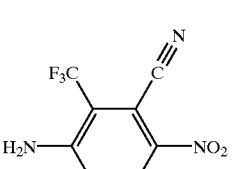 | 37.2 | 0.68 | This invention |
| 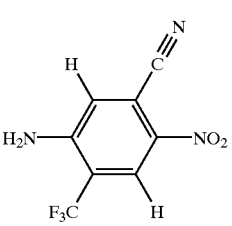 | 45.5 | 0.83 | This invention |

TABLE 17-continued

EO Molecules of this Invention

| Structure | $\mu\beta$ | Relative Ranking | Comments |
|---|---|---|---|
| 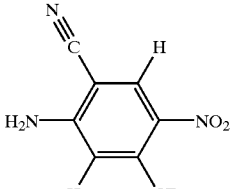 | 31.8 | 0.58 | This invention |
| 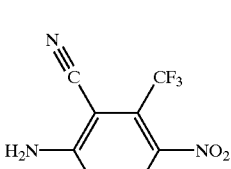 | 17.8 | 0.33 | This invention |

System Example 1

In a less complex embodiment, the optically active chromophores are physically blended with the polymer, preferably in solvents, spin applied into thin dry films onto appropriate substrates, followed by the application of electrodes, and then poling the films at higher temperatures followed by cooling to produce the final product. In a more complex embodiment, the optically active chromophore has a functional group on the molecule that can be copolymerized into the polymer network in order to create a more durable and stable system.

For example, for crosslinking, the optically active chromophore should contain the functional groups represented in the chemical structure below: (For further details, for modification of optically active (EO) chromophores to contain reactive functional groups, see the J. March reference noted earlier.):

—CH=CH$_2$

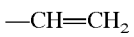

—OH
—COOH

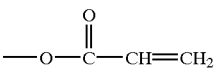

Examples of preferred polymer/electrooptical chromophore systems are represented by the following chemical structures. The structure on the left represents the blending of a polymer with an optically active chromophore, while the structure on the right represents the copolymerization of a polymer with an optically active chromophore.

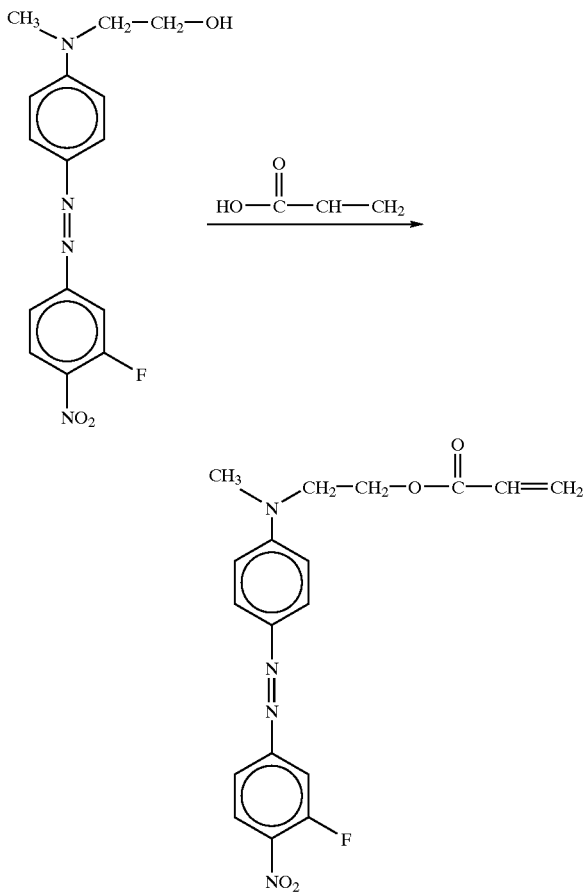

(See Polymer Example 5, Sample 2 of this invention).

System Example 2

Relationship Between Adhesion, Optically Active Chromophore Compatibility and Optical Loss Quality The use of adhesion promotion agents (silanes, acids, hydroxyls and other carbon-hydrogen bond materials) does increase the overall durability of the polymer/substrate system. The problem, however, is that using these types of traditional adhesion promotion agents also can decrease the optical quality of the total system and decrease the stability or effectiveness of the optically active chromophore.

The present invention provides a unique combination of a nitrile group (CN) in combination with silane or fluorosilane coupling agents which not only reduces the amount of silane needed for adhesion but improves the optical quality and EO efficiency of the total system. Table 18 illustrates this effect.

TABLE 18

| Adhesion Promotion | |
|---|---|
| System | Results |
| No Silane added to the polymer backbone for adhesion | No adhesion, good optical quality poor EO compatibility |
| Silane added to the polymer backbone for adhesion. | Good adhesion, poor optical quality, poor EO compatibility. |
| Fluorosilane added to the polymer backbone for adhesion. | Good adhesion, good optical quality, poor EO compatibility. |
| Nitrile added to the polymer backbone. | Small amount of adhesion good optical quality, good EO compatibility. |
| Combination of silanes or fluorosilanes added to the polymer backbone along with the nitrile group. | Excellent adhesion, excellent optical quality and EO compatibility. |

System Example 3

Thermooptic Switch

This example illustrates that the functional optical materials of the present invention are useful in thermooptic switches. Referring to the Drawing, a typical plastic optical fiber having a polymethacrylate core 101 and a fluoropolymer cladding 102 was treated with tetrahydrofuran solvent to partially remove the cladding 102 at segment 103 and expose the core 101. The plastic optical fiber was ordered from Edmund Scientific, Industrial Optics Division, USA, Stock No. D2531™, and had a core diameter of 240 microns, while the total fiber diameter was 250 microns. The core 101 consisted of polymethyl-methacrylate (refractive index of 1.492) and the cladding 102 consisted of a fluorinated polymer (refractive index of 1.402). The core 101 of the fiber at segment 103 was then overcoated with a functional optical material 105 made from polymers and optically active chromophores of this invention to form a modified fiber 100. The polymers and optically active chromophores were those illustrated in Polymer Example 2. Both the conventional EO chromophore (metanitroaniline or Disperse Red-1) and the EO chromophores of this invention were used in these tests.

Referring again to the Drawing, the modified fiber 100 was placed in a test apparatus 150, in order to measure the thermooptical properties of the functional optical material 105 of this invention. Test apparatus 150 consisted of a heating block 152 that held the modified fiber 100. The heating block was made up of an electrical heating coil (not shown) and connected to a source of electrical power 154. A thermocouple 160 was mounted to the functional optical material 105 to allow temperature measurements. The thermocouple 160 was connected to a display unit 162 for amplification of the signal and display. A light source 170 was used to send a light 172 into one end of the modified fiber 100 and a light detector 174 for detected light 176 that had passed through the modified fiber 100.

The core 101 consisting of polymethylmethacrylate had a refractive index of about 1.49. The functional optical material 105 was adjusted to have a refractive index of about 1.49 to about 1.5 at room temperature. Upon heating the modified fiber 100 the overall refractive index of the modified fiber 100 decreased.

At room temperature there was only a small amount of light being transmitted through core 101 of modified fiber 100. When the segment 103 containing functional optical material 105 was heated, the refractive index was lowered and more light was transmitted through the modified fiber 100. Cooling the modified fiber 100 back to room temperature resulted in a higher refractive index segment and thus less light was guided in the core resulting in a lower intensity output. Thus, the thermooptic light intensity modulation was reversible.

An electrooptic switch or modulator could be made using the same materials with slightly different ratios of compounds and with the application of electrodes. Electrooptic switches and modulators are well known in the art so that once knowing the teachings of the present invention the fabrication of an electrooptic switch or electrooptic modulator with the herein disclosed materials will be within the skill of the person of ordinary skill in the art. Typical applications in which the functional optical materials of the invention may be used are disclosed in: U.S. Pat. No. 5,857,039 to Bosc; U.S. Pat. No. 5,659,010 to Sotoyama et al.; U.S. Pat. No. 5,818,983 to Yoshimura et al.; U.S. Pat. No. 3,589,794 to Marcatili; and Dielectric Rectangular Waveguide and Directional Coupler for Integrated Optics, E. A. J. Marcatili, Bell Syst. Tech. 3. vol. 48, pp.2071–2102, September 1969.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A functional optical material for use in an optical system, comprising:
   (a) a polymer selected from the group consisting of,
      (1) a thermoplastic polymer;
      (2) a thermosetting polymer; and
      (3) a combination of thermoplastic and thermosetting polymers; wherein said thermoplastic and/or thermosetting polymers contain carbon-hydrogen and/or carbon-fluoride functionality; and
   (b) one or more optically active chromophores blended and/or copolymerized with said polymer;
   (c) a compatibilizer copolymerized with said polymer of step (a), having one or more pendant groups selected from the group consisting of nitriles, esters, aromatics fluorinated esters, and fluorinated aromatics; and
   (d) an adhesion promoter copolymerized with said polymer of step (a), having one or more pendant groups selected from the group consisting of nitriles, silanes, fluorinated silanes, organic acids, fluorinated organic acids, alcohols, fluorinated alcohols, amides, and amines; and
wherein when a compatibilzer with one particular pendant group is selected, an adhesion promoter with a different pendant group is selected.

2. The functional optical material according to claim 1, wherein said thermoplastic and/or thermosetting polymer is selected from the group consisting of acrylics/methacrylics; copolymers of acrylic acid esters, methacrylic acid esters, and other single unsaturated monomers; polyesters; polyurethanes; polyimides; polyamides; polyphosphazenes; epoxy resin; and hybrid (organic-inorganic) or nanocomposite polyester polymers.

3. A functional optical material for use in an optical system, comprising:
   (a) a polymer selected from the group consisting of,
      (1) a thermoplastic polymer;
      (2) a thermosetting polymer; and
      (3) a combination of thermoplastic and thermosetting polymers; wherein said thermoplastic and/or thermosetting polymers contain carbon-hydrogen and/or carbon-fluoride functionality; and
   (b) one or more optically active chromophores blended and/or copolymerized with said polymer, wherein at least one chromophore comprises:

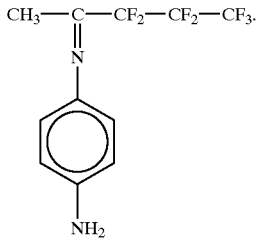

4. The functional optical material according to claim 1, wherein said functional optical material has a glass transition temperature above 100° C.

5. The functional optical material according to claim 1, wherein said functional optical material has a refractive index value of less than about 1.5.

6. The functional optical material according to claim 1, wherein said functional optical material has a refractive index value of greater than or equal to about 1.5.

7. The functional optical material according to claim 1, wherein said functional optical material has between 0.1 and 10% of said adhesion promoter.

8. The functional optical material according to claim 1, wherein said compatibilizer has a pendant group selected from the group consisting of nitrile, ester, fluorinated ester, and fluorinated aromatic.

9. The functional optical material according to claim 1, wherein said adhesion promoter has a pendant group selected from the group consisting of nitrile, silane, fluorinated silane, organic acid; fluorinated organic acid, alcohol, and fluorinated alcohol.

10. The functional optical material according to claim 1, wherein monomers are included that provide water resistance by having styrene and/or cycloaliphatic groups.

11. The functional optical material according to claim 1, wherein said functional optical material has between 0.1 and 20% of said compatibilizer.

12. The functional optical material according to claim 1, wherein there is less than 5 wt. % of hydrogen in the functional optical material.

13. The functional optical material according to claim 1, wherein said functional optical material has less than 2% water absorption according to a 24 hour water immersion test.

14. The functional optical material according to claim 1, wherein said functional optical material requires less than 100 volts per micron of film thickness to pole said functional optical material.

15. The functional material according to claim 1, wherein said compatibilizer is selected having a nitrile group, and said adhesion promoter is selected having a silane group.

16. The functional optical material according to claim 1, wherein said one or more optically active chromophores is (are) selected from the group consisting of a substituted aniline, substituted azobenzene, substituted stilbene, and substituted imine.

17. A functional optical material for use in an optical system, comprising:
   (a) a polymer selected from the group consisting of,
      (1) a thermoplastic polymer;
      (2) a thermosetting polymer; and
      (3) a combination of thermoplastic and thermosetting polymers; wherein said thermoplastic and/or thermosetting polymers contain carbon-hydrogen and/or carbon-fluoride functionality; and (b) one or more optically active chromophores blended and/or copolymerized with said polymer, wherein at least one chromophore comprises:

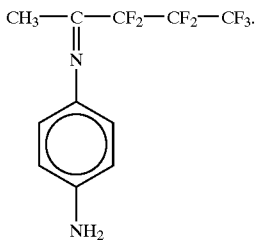

18. A functional optical material useful in an optical system comprising: a polymer of
    (a) one or more partially or fully fluorinated first monomer(s) having a refractive index of less than about 1.5, or wherein a homopolymer formed from said first monomer(s) has a refractive index of less than about 1.5;
    (b) zero, one, or more second monomer(s) having a refractive index≧1.5, or wherein a homopolymer formed from said second monomer(s) has a refractive index≧1.5;
    (c) at least one optically active chromophore;
    (d) at least one compatibilizer, having one or more pendant groups selected from the group consisting of nitriles, esters, aromatics, fluorinated esters, and fluorinated aromatics for said optically active chromophore;
    (e) at least one adhesion promoter, having one or more pendant groups selected from the group consisting of nitriles, silanes, fluorinated silanes, organic acids, fluorinated organic acids, alcohols, fluorinated alcohols, amides, and amines; wherein when a compatibilizer with one particular pendant group is selected, an adhesion promoter with a different pendant group is selected.

19. A method of forming a functional optical material comprising:
    A. determining if a low index of refraction material (n<1.5) or high index of refraction material (n≧1.5) is desired,
    B. for a low refractive index optical material
       (1) selecting one or more monomers having a low index of refraction;
       (2) selecting zero, one, or more monomers having a high index of refraction, wherein the concentration of the monomer(s) with a high index of refraction is less than the concentration of monomer(s) having a low index of refraction;
       (3) selecting zero, one or more optically active chromophores;
       (4) selecting zero, one, or more of conventional optical chromophores, with the proviso that at least one chromophore must be selected;
       (5) selecting one or more compatibilizers for the selected chromophore(s), having one or more pendant groups selected from the group consisting of nitriles, esters, aromatics, fluorinated esters, and fluorinated aromatics; and
       (6) selecting one or more adhesion promoters, having one or more pendant groups selected from the group consisting of nitriles, silanes, fluorinated silanes, organic acids, fluorinated organic acids, alcohols, fluorinated alcohols, amides, and amines; wherein when a compatibilzer with one particular pendant group is selected, an adhesion promoter with a different pendant group is selected; and
       (7) mixing and reacting said selected monomer(s), chromophore(s), compatibilizer, and adhesion promoter;
    C. for a high refractive index optical material
       (1) selecting one or more monomers having a high index of refraction; (2) selecting zero, one, or more monomers having a low index of refraction, wherein the concentration of the monomer(s) with a low index of refraction is less than the concentration of monomer(s) having a high index of refraction;
       (3) selecting zero, one or more optically active chromophores;
       (4) selecting zero, one, or more of conventional optical chromophores, with the proviso that at least one chromophore must be selected;
       (5) selecting one or more compatibilizers for the selected chromophore(s), having one or more pendant groups selected from the group consisting of nitriles, esters, aromatics fluorinated esters, and fluorinated aromatics; and
       (6) selecting one or more adhesion promoters, having one or more pendant groups selected from the group consisting of nitriles, silanes, fluorinated silanes, organic acids; fluorinated organic acids, alcohols, fluorinated alcohols, amides, and amines; wherein when a compatibilzer with one particular pendant group is selected, an adhesion promoter with a different pendant group is selected; and
       (7) mixing and reading said selected monomer(s), chromophore(s), compatibilizer, and adhesion promoter.

20. The method according to claim 19, wherein high $T_g$ materials are prepared by selecting and reacting fluorinated monomers with nonfluorinated monomers.

21. The functional optical material according to claim 16, wherein one of said optically active chromophores comprises:

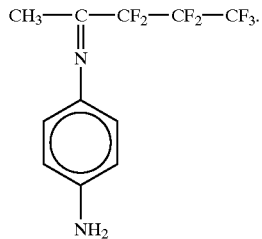

22. The functional optical material according to claim 16, wherein one of said optically active chromophores comprises:

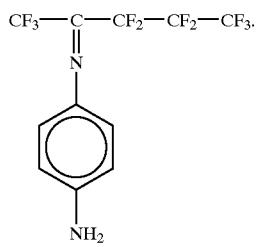

23. The functional optical material according to claim 16, wherein said compatibilizer has a nitrile group, and said one or more optically active chromophores are selected from substituted anilines comprising:

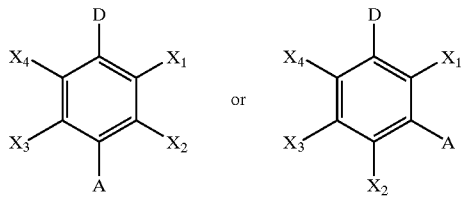

Wherein D=donor=—NH$_2$, —N(CH$_3$)$_2$, —N(CH$_2$CH$_3$)$_2$, or —N(Y)$_2$ where Y=alkyl alcohols, alkyl (hydrocarbon or fluorocarbon) esters, or alkyl silane derivatives;

A=acceptor=—NO$_2$, or —C(CN)C(CN)$_2$, and wherein X$_1$, X$_2$, X$_3$, X$_4$ are each —H.

24. The functional optical material according to claim 16, wherein said one or more optically active chromophores is (are) selected from substituted azobenzenes comprising:

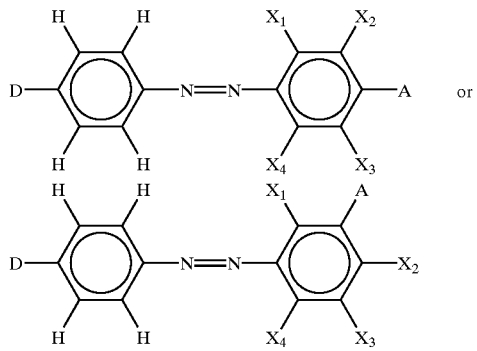

Wherein D=donor=—NH$_2$, —N(CH$_3$)$_2$, —N(CH$_2$CH$_3$)$_2$, or —N(Y)$_2$ where Y=alkyl alcohols, alkyl (hydrocarbon or fluorocarbon) esters, or alkyl silane derivatives;

A=acceptor=—NO$_2$, or —C(CN)C(CN)$_2$, and wherein X$_1$, X$_2$, X$_3$, X$_4$ are each —H.

25. The functional optical material according to claim 16, wherein said one or more optically active chromophores is (are) selected from substituted stilbenes comprising:

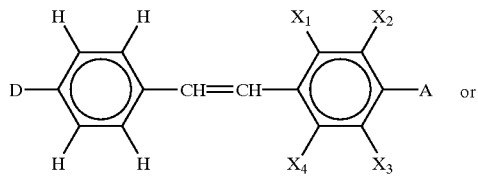

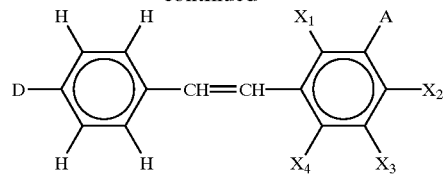

Wherein D=donor=—NH$_2$, —N(CH$_3$)$_2$, —N(CH$_2$CH$_3$)$_2$, or —N(Y)$_2$ where Y=alkyl alcohols, alkyl (hydrocarbon or fluorocarbon) esters, or alkyl silane derivatives;

A=acceptor=—NO$_2$, or —C(CN)C(CN)$_2$, and wherein X$_1$, X$_2$, X$_3$, X$_4$ are each —H.

26. The functional optical material according to claim 16, wherein said one or more optically active chromophores is (are) selected from substituted imines comprising:

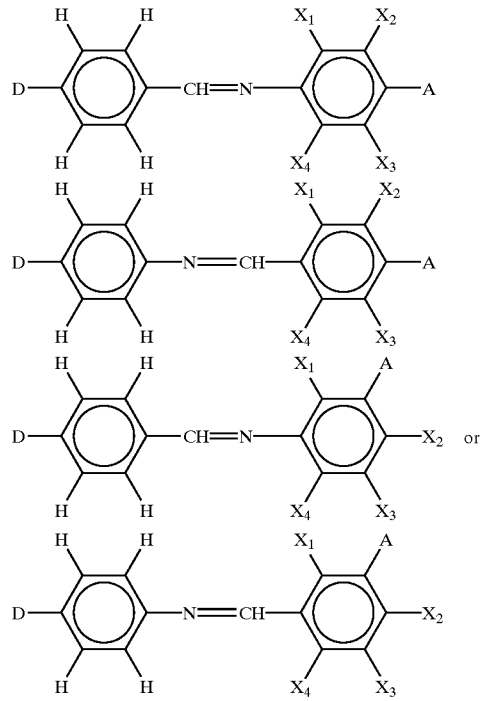

Wherein D=donor=—NH$_2$, —N(CH$_3$)$_2$, —N(CH$_2$CH$_3$)$_2$, or —N(Y)$_2$ where Y=alkyl alcohols, alkyl (hydrocarbon or fluorocarbon) esters, or alkyl silane derivatives;

A=acceptor=—NO$_2$, or —C(CN)C(CN)$_2$, and wherein X$_1$, X$_2$, X$_3$, X$_4$ are each —H.

* * * * *